United States Patent
Arumugam et al.

(10) Patent No.: US 12,306,722 B2
(45) Date of Patent: May 20, 2025

(54) BLOCKCHAIN FOR CLOUD DATA MANAGEMENT

(71) Applicant: Rubrik, Inc., Palo Alto, CA (US)

(72) Inventors: Chendil Kumar Arumugam, Bengaluru (IN); Aditi Maheshwari, Jaipur (IN); Animesh Kumar, Navi Mumbai (IN)

(73) Assignee: Rubrik, Inc., Palo Alto, CA (US)

( * ) Notice: Subject to any disclaimer, the term of this patent is extended or adjusted under 35 U.S.C. 154(b) by 259 days.

(21) Appl. No.: 17/710,714

(22) Filed: Mar. 31, 2022

(65) Prior Publication Data

US 2023/0315579 A1     Oct. 5, 2023

(51) Int. Cl.
*G06F 11/14*     (2006.01)
*H04L 9/32*     (2006.01)

(52) U.S. Cl.
CPC ........ *G06F 11/1458* (2013.01); *H04L 9/3242* (2013.01); *G06F 2201/84* (2013.01)

(58) Field of Classification Search
CPC ............. G06F 11/1458; G06F 2201/84; H04L 9/3242; H04L 9/0894; H04L 9/50
USPC ....................................................... 713/189
See application file for complete search history.

(56) References Cited

U.S. PATENT DOCUMENTS

| | | | |
|---|---|---|---|
| 9,152,686 B2* | 10/2015 | Whitehead | G06F 11/1469 |
| 9,158,630 B1 | 10/2015 | Natanzon | |
| 10,628,268 B1 | 4/2020 | Baruch et al. | |
| 11,334,443 B1* | 5/2022 | Aseev | H04L 9/50 |
| 2018/0322160 A1* | 11/2018 | Horii | G06F 16/2379 |
| 2021/0117385 A1* | 4/2021 | Haldar | G06F 11/1448 |
| 2021/0149775 A1* | 5/2021 | Novotny | H04L 9/3239 |

OTHER PUBLICATIONS

Kalis et al., Validating Data Integrity with Blockchain, 2018 IEEE International Conference on Cloud Computing Technology and Science (CloudCom), Dec. 10-13, 2018, DOI: 10.1109/CloudCom2018. 2018.00060, 6 pgs.

\* cited by examiner

*Primary Examiner* — Jacob Lipman
(74) *Attorney, Agent, or Firm* — Holland & Hart LLP

(57) ABSTRACT

A method for data management is described. The method may include generating a first snapshot of a first state of a data object, generating, using metadata associated with the first snapshot of the first state, a first hash value, and storing the first hash value to a blockchain. If the data object or device or system supporting the data object fails, then a failover procedure may be used to recover the data object. The method may include receiving an instruction to recover the first state of the data object using the first snapshot, retrieving the first hash value from the blockchain, comparing the first hash value retrieved from the blockchain to a second hash value of the metadata associated with the first snapshot, and determining, based at least in part on a result of the comparing, whether the first snapshot stored in the data management system is unmodified.

20 Claims, 12 Drawing Sheets

BLOCKCHAIN FOR CLOUD DATA MANAGEMENT

FIELD OF TECHNOLOGY

The present disclosure relates generally to database systems and data processing, and more specifically to blockchain for cloud data management.

BACKGROUND

A computing system may be employed to manage, process, backup, and restore data using a network of computing devices.

Some data management systems may utilize virtual machines to support data management at a plurality of storage devices. In some examples, a data management system may periodically generate snapshots of a virtual machine, and the snapshot may represent a current state of the virtual machine. If a virtual machine fails, a failover procedure may be used to replicate the virtual machine using a snapshot. In some cases, it may be desirable to verify or validate a snapshot before using it to restore a virtual machine, object, or the like.

DETAILED DESCRIPTION

Figure 1:
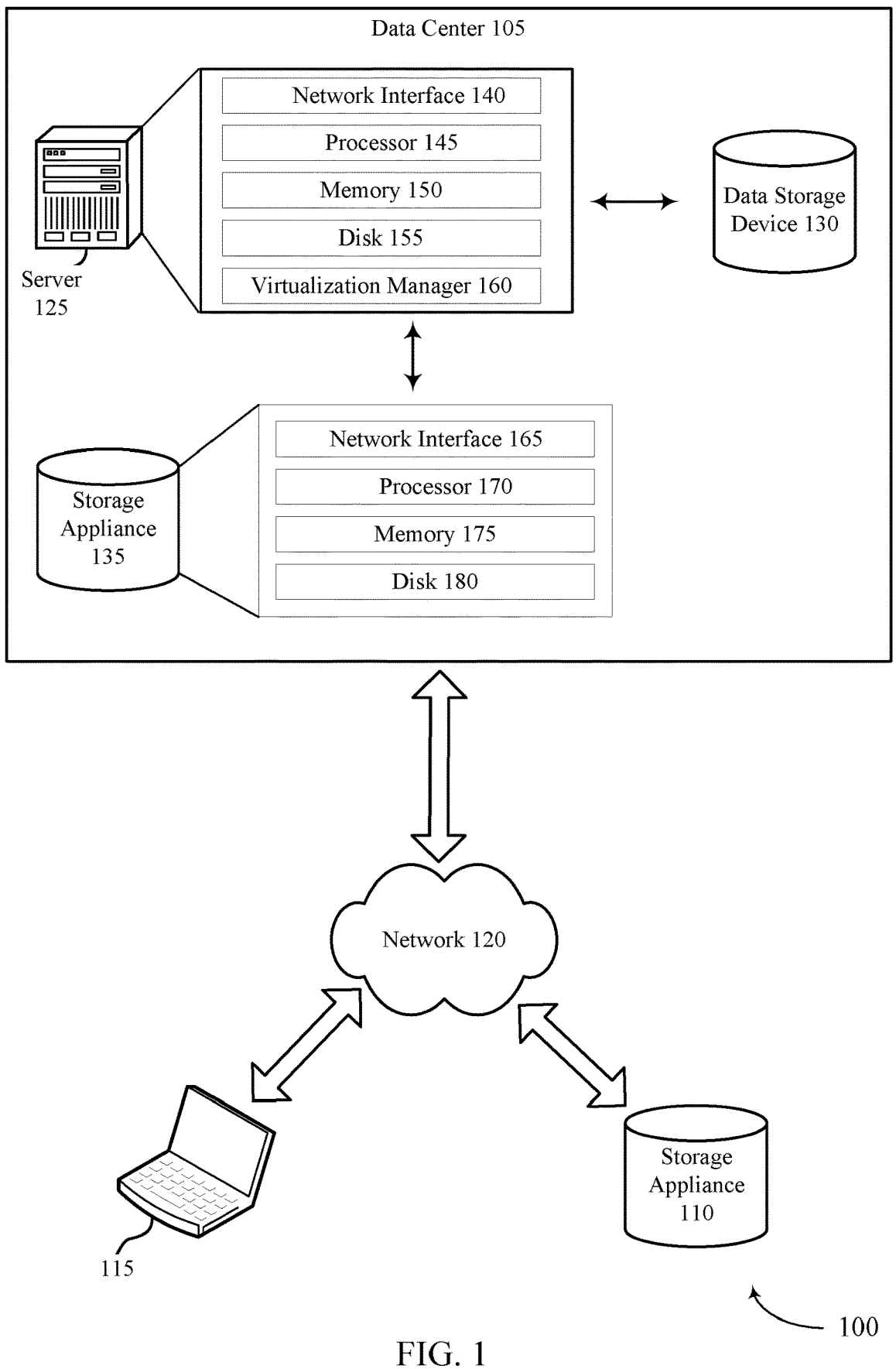
FIG. 1 illustrates an example of a computing environment that supports blockchain for cloud data management in accordance with aspects of the present disclosure.

Some computing systems may utilize virtual machines to support application execution and management of data associated with the applications. For example, the virtual machines may support a webserver, a database server, or logic for other types of services. The virtual machine may virtualize a set of physical computing systems (e.g., data storage devices) in order to manage data storage, processing, and retrieval for application support. In some examples, these computing systems may periodically generate snapshots of a virtual machine, and the snapshot may represent a current state of the virtual machine. If a virtual machine fails, a failover procedure may be used to replicate the virtual machine using a snapshot. These snapshots and backups may be generated according to a service level agreement.

In some cases, data management systems may validate or authenticate a snapshot before performing a failover recover using the snapshot. To support snapshot validation as well as service level agreement adherence, implementations described herein support using blockchain technology to store a history of snapshots and to function as a source of truth associated with the snapshots. For example, a snapshot of a data object (e.g., database, file, virtual machine, virtual disk, a hard disc drive, a virtual desktop, one or more folders) may be generated, and the snapshot may be any data file or point-in-time image representing the state of the data object at a particular time. A hash value associated with the snapshot may be generated. For example, a set of metadata associated with the snapshot may be used as an input into a hash function. The output of the hash function (e.g., hash value) may be stored to the blockchain in association with a timestamp. That is, a transaction may be executed such that the transaction results in storage of the hash value and timestamp to the blockchain.

As blockchains may be examples of distributed, verifiable, and immutable transaction ledgers, these hash values for a snapshot may be subsequently used to verify the integrity of a snapshot. As such, a data management system may retrieve a hash value associated with the snapshot from the blockchain and compare the hash value to another hash value generated in association with the stored snapshot to confirm that the integrity of the snapshot. If the hash values match, the data management system may determine that the snapshot is unmodified. If the hash values do not match, then the data management system may determine that the snapshot is not validated (e.g., the snapshot is modified). In some cases, the snapshot is generated using an immutable template file of the data object. In some examples, the immutable template file may be referred to as a "golden image" and may include network certificates, network configurations, application configurations, operating system configurations, or a combination of these.

Other techniques described herein may support further data security. For example, a key that is used to secure (e.g., encrypt) the snapshot may also be stored to the blockchain in association with the hash value of the snapshot and the time stamp. Thus, upon object recovery, the key may be retrieved to decrypt the snapshot. Additionally, rather than storing the entire data image of the data object to the blockchain, which may use significant computing resources, the metadata associated with the snapshot may be used to generate the hash value. This technique may result in improved hash value generation efficiencies, as well as improved efficiencies in blockchain interaction. For example, the hash value may in some cases be generated using a row of a backup metadata table for the data object. As such, the inputs for the hash value may in some cases use inputs that exclude the full image captured by the snapshot. These and other techniques are described in further detail with respect to the figures.

Aspects of the disclosure are initially described in the context a computing environment supporting backup and recovery services. Aspects of the disclosure are further described with respect to a storage appliance, a server, a computing environment, a transition diagram, and a process flow illustrating using blockchain to support data object backup and recovery. Aspects of the disclosure are further illustrated by and described with reference to apparatus diagrams, system diagrams, and flowcharts that relate to blockchain for cloud data management.

FIG. 1 illustrates an example of a computing environment 100 for cloud computing that supports blockchain for cloud data management in accordance with various aspects of the present disclosure. The computing environment 100 may include a data center 105, a storage appliance 110, and a computing device 115 in communication with each other via one or more networks 120. The computing environment 100 may also include one or more computing devices interconnected through one or more networks 120. The one or more networks 120 may allow computing devices or storage devices to connect to and communicate with other computing devices or other storage devices. In some examples, the computing environment 100 may include other computing devices or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network storage device, a networked-attached storage device, a hard disk drive, a solid-state drive, or a data storage system.

The data center 105 may include one or more servers, such as server 125, in communication with one or more storage devices, such as storage device 130. The one or more servers may also be in communication with one or more storage appliances, such as storage appliance 135. The server 125, storage device 130, and storage appliance 135 may be in communication with each other via a networking fabric connecting servers and data storage units within the data center 105 to each other. The storage appliance 135 may include a data management system for backing up virtual machines or files within a virtualized infrastructure. The server 125 may be used to create and manage one or more virtual machines associated with a virtualized infrastructure.

The one or more virtual machines may run various applications, such as a database application or a web server. The storage device 130 may include one or more hardware storage devices for storing data, such as a hard disk drive (HDD), a magnetic tape drive, a solid-state drive (SSD), a storage area network (SAN) storage device, or a Network Attached Storage (NAS) device. In some cases, a data center, such as data center 105, may include multiple servers and/or data storage devices in communication with each other. The one or more data storage devices 130 may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

The one or more networks 120 may include a secure network such as an enterprise private network, an unsecure network such as a wireless open network, a local area network (LAN), a wide area network (WAN), and the Internet. The one or more networks 120 may include a cellular network, a mobile network, a wireless network, or a wired network. Each network of the one or more networks 120 may include hubs, bridges, routers, switches, and wired transmission media such as a direct-wired connection. The one or more networks 120 may include an extranet or other private network for securely sharing information or providing controlled access to applications or files.

A server, such as server 125, may allow a client to download information or files (e.g., executable, text, application, audio, image, or video files) from the server 125 or to perform a search query related to particular information stored on the server 125. In some examples, a server may act as an application server or a file server. In general, server 125 may refer to a hardware device that acts as the host in a client-server relationship or a software process that shares a resource with or performs work for one or more clients.

One example of server 125 includes a network interface 140, processor 145, memory 150, disk 155, and virtualization manager 160 all in communication with each other. Network interface 140 allows server 125 to connect to one or more networks 120. Network interface 140 may include a wireless network interface and/or a wired network interface. Processor 145 allows server 125 to execute computer-readable instructions stored in memory 150 in order to perform processes described herein. Processor 145 may include one or more processing units, such as one or more CPUs and/or one or more GPUs. Memory 150 may comprise one or more types of memory (e.g., random access memory (RAM), static-RAM (SRAM), dynamic-RAM (DRAM), read-only memory (ROM), electric erasable programmable ROM (EEPROM), Flash, etc.). Disk 155 may include a hard disk drive and/or a solid-state drive. Memory 150 and disk 155 may comprise hardware storage devices.

The virtualization manager 160 may manage a virtualized infrastructure and perform management operations associated with the virtualized infrastructure. The virtualization manager 160 may manage the provisioning of virtual machines running within the virtualized infrastructure and provide an interface to computing devices interacting with the virtualized infrastructure. In one example, the virtualization manager 160 may set a virtual machine having a virtual disk into a frozen state in response to a snapshot request made via an application programming interface (API) by a storage appliance, such as storage appliance 135. Setting the virtual machine into a frozen state may allow a point in time snapshot of the virtual machine to be stored or transferred. In one example, updates made to a virtual machine that has been set into a frozen state may be written to a separate file (e.g., an update file) while the virtual disk may be set into a read-only state to prevent modifications to the virtual disk file while the virtual machine is in the frozen state.

The virtualization manager 160 may then transfer data associated with the virtual machine (e.g., an image of the virtual machine or a portion of the image of the virtual disk file associated with the state of the virtual disk at the point in time it is frozen) to a storage appliance (for example, a storage appliance 135 or storage appliance 110 of FIG. 1, described further below) in response to a request made by the storage appliance. After the data associated with the point in time snapshot of the virtual machine has been transferred to the storage appliance 135, the virtual machine may be released from the frozen state (i.e., unfrozen) and the updates made to the virtual machine and stored in the separate file may be merged into the virtual disk file. The virtualization manager 160 may perform various virtual machine-related tasks, such as cloning virtual machines, creating new virtual machines, monitoring the state of virtual machines, moving virtual machines between physical hosts for load balancing purposes, and facilitating backups of virtual machines.

The storage appliance 135 may include a network interface 165, processor 170, memory 175, and disk 180 in communication with each other. Network interface 165 may support communication of storage appliance 135 with one or more networks. Network interface 165 may include a wireless network interface and/or a wired network interface. Processor 170 may support storage appliance in execution of computer-readable instructions stored in memory 175 to perform operations described herein. Processor 170 may include one or more processing units, such as one or more central processing units (CPUs) and/or one or more graphics processing units (GPUs). Memory 175 may comprise one or more types of memory as described with respect to memory 150. Disk 180 may include a hard disk drive and/or a solid-state drive. Memory 175 and disk 180 may comprise hardware storage devices.

The storage appliance 135 or storage appliance 110 may include multiple machines, and the multiple machines may comprise multiple nodes of a server cluster. The server cluster may comprise a set of physical machines that are connected together via a network. The server cluster may be used for storing data associated with a plurality of virtual machines, such as backup data associated with different point-in-time versions of the virtual machines.

The networked computing environment 100 may provide a cloud computing environment for one or more computing devices. Cloud computing may refer to Internet-based computing, wherein shared resources, software, and/or information may be provided to one or more computing devices on-demand via the Internet. The networked computing environment 100 may comprise a cloud computing environment providing Software-as-a-Service (SaaS) or Infrastructure-as-a-Service (IaaS) services. SaaS may refer to a software distribution model in which applications are hosted by a service provider and made available to end users over the Internet. In one example, the networked computing environment 100 may include a virtualized infrastructure that provides software, data processing, and/or data storage services to end users accessing the services via the networked computing environment 100. In one example, networked computing environment 100 may provide cloud-based work productivity or business-related applications to a computing device, such as computing device 115. The storage appliance 110 may comprise a cloud-based data management system for backing up virtual machines and/or files within a virtualized infrastructure, such as virtual machines running on server 125 or files stored on server 125.

In some examples, networked computing environment 100 may provide remote access to secure applications and files stored within data center 105 from a remote computing device, such as computing device 115. The data center 105 may use an access control application to manage remote access to protected resources, such as protected applications, databases, or files located within the data center 105. To facilitate remote access to secure applications and files, a secure network connection may be established using a virtual private network (VPN). A VPN connection may allow a remote computing device, such as computing device 115, to securely access data from a private network (e.g., from a company file server or mail server) using an unsecure public network or the Internet. The VPN connection may use client-side software (e.g., running on the remote computing device) to establish and maintain the VPN connection. The VPN client software may provide data encryption and encapsulation prior to the transmission of secure private network traffic through the Internet.

In some examples, the storage appliance 135 or storage appliance 110 may manage the extraction and storage of virtual machine snapshots associated with different point in time versions of one or more virtual machines running within the data center 105. A snapshot of a virtual machine may correspond with a state of the virtual machine at a particular point-in-time. In response to a restore command from the storage device 130, the storage appliance 135 may restore a point-in-time version of a virtual machine or restore point-in-time versions of one or more files located on the virtual machine and transmit the restored data to the server 125. In response to a mount command from the server 125, the storage appliance 135 may allow a point-in-time version of a virtual machine to be mounted and allow the server 125 to read and/or modify data associated with the point-in-time version of the virtual machine. To improve storage density, the storage appliance 135 may deduplicate and compress data associated with different versions of a virtual machine and/or deduplicate and compress data associated with different virtual machines. To improve system performance, the storage appliance 135 may first store virtual machine snapshots received from a virtualized environment in a cache, such as a flash-based cache. The cache may also store popular data or frequently accessed data (e.g., based on a history of virtual machine restorations, incremental files associated with commonly restored virtual machine versions) and current day incremental files or incremental files corresponding with snapshots captured within the past 24 hours.

An incremental file may comprise a forward incremental file or a reverse incremental file. A forward incremental file may include a set of data representing changes that have occurred since an earlier point-in-time snapshot of a virtual machine. To generate a snapshot of the virtual machine corresponding with a forward incremental file, the forward incremental file may be combined with an earlier point in time snapshot of the virtual machine (e.g., the forward incremental file may be combined with the last full image of the virtual machine that was captured before the forward incremental file was captured and any other forward incremental files that were captured subsequent to the last full image and prior to the forward incremental file). A reverse incremental file may include a set of data representing changes from a later point-in-time snapshot of a virtual machine. To generate a snapshot of the virtual machine corresponding with a reverse incremental file, the reverse incremental file may be combined with a later point-in-time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 135 or storage appliance 110 may provide a user interface (e.g., a web-based interface or a graphical user interface) that displays virtual machine backup information such as identifications of the virtual machines protected and the historical versions or time machine views for each of the virtual machines protected. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

The user interface may enable an end user of the storage appliance 110 (e.g., a system administrator or a virtualization administrator) to select a particular version of a virtual machine to be restored or mounted. When a particular version of a virtual machine has been mounted, the particular version may be accessed by a client (e.g., a virtual machine, a physical machine, or a computing device) as if the particular version was local to the client. A mounted version of a virtual machine may correspond with a mount point directory (e.g., /snapshots/VM5Nersion23). In one example, the storage appliance 110 may run a Network File System (NFS) server and make the particular version (or a copy of the particular version) of the virtual machine accessible for reading and/or writing. The end user of the storage appliance 110 may then select the particular version to be mounted and run an application (e.g., a data analytics application) using the mounted version of the virtual machine. In another example, the particular version may be mounted as an Internet Small Computer Systems Interface (iSCSI) target.

As described herein, the storage appliance 135 may support object backup and replication. The objects may include virtual machines, virtual discs, hard disc drives, servers, a desktop, a file, or a combination thereof. To support object backup and replication, periodic snapshots of an object may be generated and stored to the storage appliance 135 or another location. The snapshots may be generated according to a schedule set forth in a service level agreement, which may be configurable at the storage appliance 135. The snapshots may be stored for a period of time and used for replication during failure of a device that supports the object. For example, during a failover recovery procedure resulting from device failure, a snapshot may be used to replicate the object at a new device/system in the state captured by the snapshot.

In some examples, it may be desirable to verify the integrity of the snapshot. For example, upon failover recovery, the snapshot may be validated or verified before using the snapshot for recovery of the data object. Implementations described herein support snapshot validation using blockchain or distributed ledger technology. For example, upon generation of or receipt of a snapshot associated with a data object, the storage appliance 135 may generate a hash value associated with the snapshot. The hash value may be stored to a blockchain and used as a source of truth associated with the snapshot. The snapshot itself (in addition to a copy of the hash value, in some cases) may be stored on the storage appliance. During a failover procedure, the storage appliance 135 may retrieve the hash value from the blockchain and compare the hash value to a hash value generated in associated with the snapshot that is to be used to recover the object to verify or validate the integrity of the snapshot. Thus, the techniques described herein support data security and integrity by using blockchain as a source of truth for snapshot validation.

It is to be understood that one or more aspects of the disclosure may be implemented in a computing environment 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
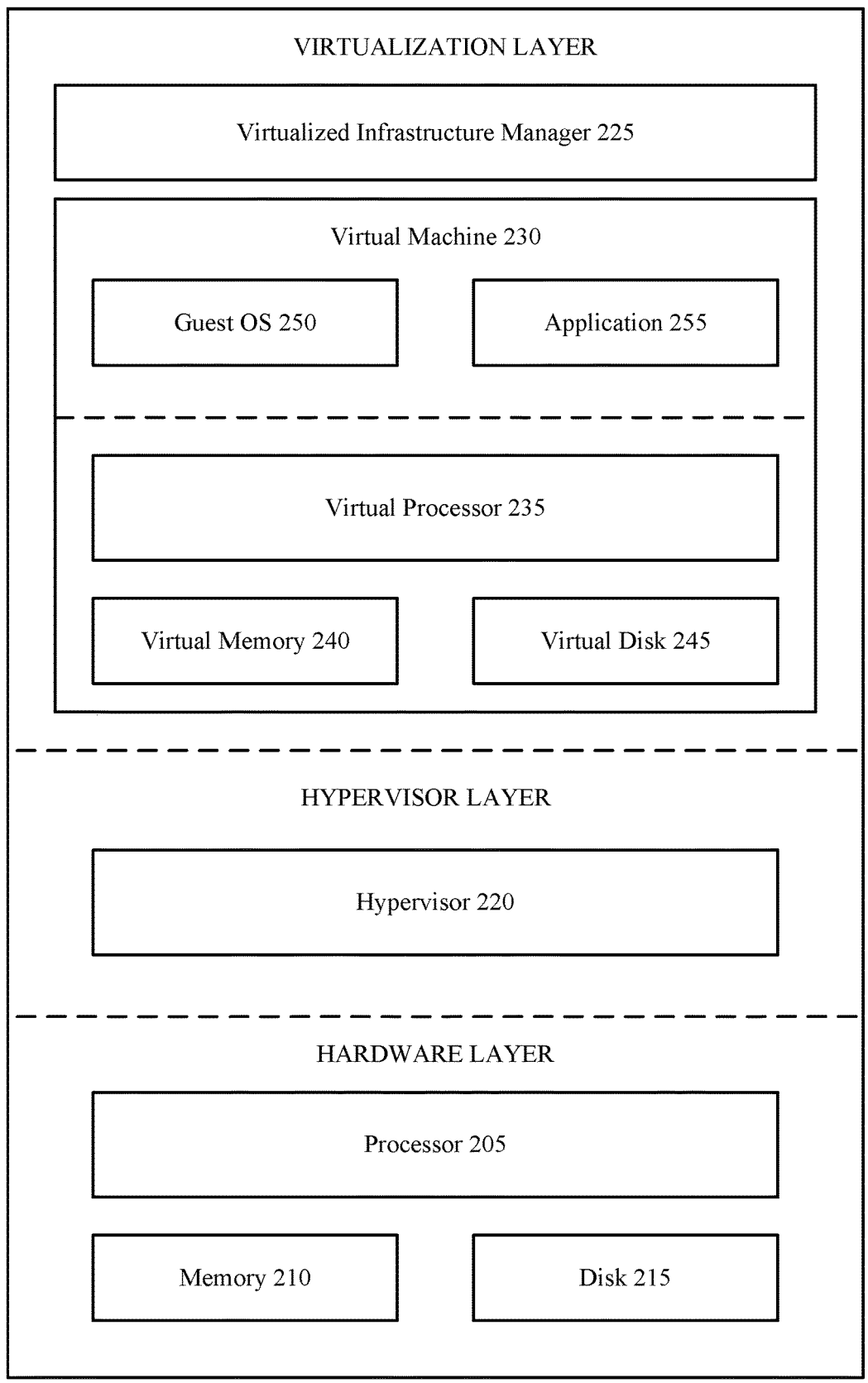
FIG. 2 illustrates an example of a server that supports blockchain for cloud data management in accordance with aspects of the present disclosure.

FIG. 2 illustrates an example of a server 200 that supports blockchain for cloud data management in accordance with aspects of the present disclosure. The server 200 may be an example of a server 125 described with reference to FIG. 1. The server 200 may include one server out of a plurality of servers that are networked together within a data center (e.g., data center 105 described with reference to FIG. 1). In one example, the plurality of servers may be positioned within one or more server racks within the data center. As depicted, the server 200 includes hardware-level components and software-level components. The hardware-level components include one or more processors 205, one or more memory 210, and one or more disks 215. The software-level components include a hypervisor 220, a virtualized infrastructure manager 225, and one or more virtual machines, such as virtual machine 230. The hypervisor 220 may include a native hypervisor or a hosted hypervisor. The hypervisor 220 may provide a virtual operating platform for running one or more virtual machines, such as virtual machine 230. Virtual machine 230 includes a plurality of virtual hardware devices including a virtual processor 235, a virtual memory 240, and a virtual disk 245. The virtual disk 245 may include a file stored within the one or more disks 245. In one example, a virtual machine 230 may include a plurality of virtual disks 245, with each virtual disk of the plurality of virtual disks 245 associated with a different file stored on the one or more disks 245. Virtual machine 230 may include a guest operating system 250 that runs one or more applications, such as application 255.

The virtualized infrastructure manager 225, which may be an example of the virtualization manager 160 described with reference to FIG. 1, may run on a virtual machine or natively on the server 200. The virtual machine may, for example, be or include the virtual machine 230 or a virtual machine separate from the server 200. Other arrangements are possible. The virtualized infrastructure manager 225 may provide a centralized platform for managing a virtualized infrastructure that includes a plurality of virtual machines. The virtualized infrastructure manager 225 may manage the provisioning of virtual machines running within the virtualized infrastructure and provide an interface to computing devices interacting with the virtualized infrastructure. The virtualized infrastructure manager 225 may perform various virtualized infrastructure related tasks, such as cloning virtual machines, creating new virtual machines, monitoring the state of virtual machines, and facilitating backups of virtual machines.

In an example, the server 200 may use the virtualized infrastructure manager 225 to facilitate backups for a plurality of virtual machines running on the server 200. One or more of the virtual machines running on the server 200 may run its own guest operating system and its own set of applications. Each virtual machine running on the server 200 may store its own set of files using one or more virtual disks associated with the virtual machine (e.g., each virtual machine may include two virtual disks that are used for storing data associated with the virtual machine).

In an example, a data management application running on a storage appliance, such as storage appliance 110 in FIG. 1 or storage appliance 135 in FIG. 1, may request a snapshot of a virtual machine running on server 200. The snapshot of the virtual machine may be stored as one or more files, with each file associated with a virtual disk of the virtual machine. A snapshot of a virtual machine may correspond with a state of the virtual machine at a particular point in time. The particular point in time may be associated with a time stamp. In one example, a first snapshot of a virtual machine may correspond with a first state of the virtual machine (including the state of applications and files stored on the virtual machine) at a first point in time and a second snapshot of the virtual machine may correspond with a second state of the virtual machine at a second point in time subsequent to the first point in time.

In response to a request for a snapshot of a virtual machine at a particular point in time, the virtualized infrastructure manager 225 may set the virtual machine into a frozen state or store a copy of the virtual machine at the particular point in time. The virtualized infrastructure manager 225 may then transfer data associated with the virtual machine (e.g., an image of the virtual machine or a portion of the image of the virtual machine) to the storage appliance 110 or storage appliance 135. The data associated with the virtual machine may include a set of files including a virtual disk file storing contents of a virtual disk of the virtual machine at the particular point in time and a virtual machine configuration file storing configuration settings for the virtual machine at the particular point in time. The contents of the virtual disk file may include the operating system used by the virtual machine, local applications stored on the virtual disk, and user files (e.g., images and word processing documents). In some cases, the virtualized infrastructure manager 225 may transfer a full image of the virtual machine to the storage appliance 110 or storage appliance 135 of FIG. 1 or a plurality of data blocks corresponding with the full image (e.g., to enable a full image-level backup of the virtual machine to be stored on the storage appliance). In other cases, the virtualized infrastructure manager 225 may transfer a portion of an image of the virtual machine associated with data that has changed since an earlier point in time prior to the particular point in time or since a last snapshot of the virtual machine was taken. In one example, the virtualized infrastructure manager 225 may transfer data associated with virtual blocks stored on a virtual disk of the virtual machine that have changed since the last snapshot of the virtual machine was taken. In one example, the data management application may specify a first point in time and a second point in time and the virtualized infrastructure manager 225 may output one or more virtual data blocks associated with the virtual machine that have been modified between the first point in time and the second point in time.

In some examples, the server 200 or the hypervisor 220 may communicate with a storage appliance, such as storage appliance 110 in FIG. 1 or storage appliance 135 in FIG. 1, using a distributed file system protocol such as NFS Version 3, or Server Message Block (SMB) protocol. The distributed file system protocol may allow the server 200 or the hypervisor 220 to access, read, write, or modify files stored on the storage appliance as if the files were locally stored on the server 200. The distributed file system protocol may allow the server 200 or the hypervisor 220 to mount a directory or a portion of a file system located within the storage appliance.

As described herein, the server 200 and/or a storage appliance may support snapshot generation and validation for backup and failover recovery. In some examples, the server 200 may generate or receive snapshots and generate hash values associated with the snapshots. The hash values may be stored to a blockchain for subsequent snapshot validation during a failover recovery procedure. During the subsequent failover recovery procedure, the hash value may be retrieved from the blockchain and compared to a hash value associated with the stored snapshot to verify or validate the integrity of the stored snapshot before using the snapshot to recover the state of the object.

Figure 3:
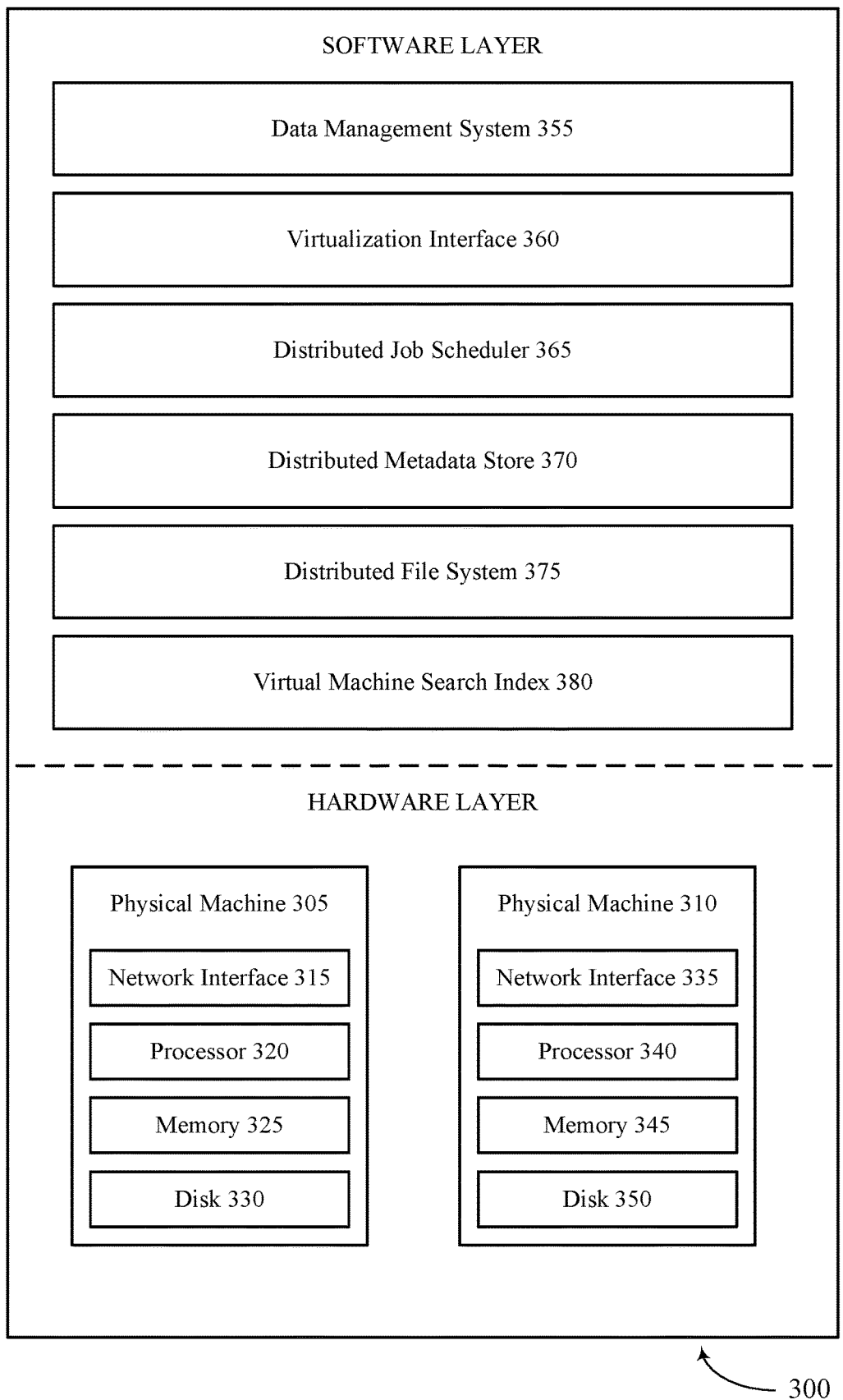
FIG. 3 illustrates an example of a storage appliance that supports blockchain for cloud data management in accordance with aspects of the present disclosure.

FIG. 3 illustrates an example of a storage appliance 300 that supports blockchain for cloud data management in accordance with aspects of the present disclosure. The storage appliance 300 may be an example of a storage appliance 110 or a storage appliance 135 as described with reference to FIG. 1. The storage appliance 300 may include a plurality of physical machines that may be grouped together and presented as a single computing system. One or more of the physical machines of the plurality of physical machines may comprise a node in a cluster. A cluster may be configured as a failover cluster for performing one or more failover operations as described herein. In one example, the storage appliance 300 may be positioned within a server rack within a data center, such as data center 105 as described with reference to FIG. 1. As depicted, the storage appliance 300 includes hardware-level components and software-level components. The hardware-level components include one or more physical machines, such as physical machine 305 and physical machine 310. The physical machine 305 includes a network interface 315, processor 320, memory 325, and disk 330 all in communication with each other. Processor 320 allows physical machine 305 to execute computer readable instructions stored in memory 325 to perform processes described herein. Disk 330 may include a hard disk drive and/or a solid-state drive. The physical machine 310 may include a network interface 335, processor 340, memory 345, and disk 350 all in communication with each other. Processor 340 allows physical machine 310 to execute computer readable instructions stored in memory 345 to perform processes described herein. Disk 350 may include a hard disk drive and/or a solid-state drive. In some examples, disk 350 may include a flash-based SSD or a hybrid HDD/SSD drive. In one example, the storage appliance 300 may include a plurality of physical machines arranged in a cluster. One or more of the plurality of physical machines may include a plurality of multi-core CPUs, RAM (e.g., 108 GB of RAM), SSD space (e.g., a 500 GB SSD), HDD space (e.g., four 4 TB HDDs), and a network interface controller.

In some examples, the plurality of physical machines may be used to implement a cluster-based network fileserver. The cluster-based network file server may neither require nor use a front-end load balancer. One issue with using a front-end load balancer to host the IP address for the cluster-based network file server and to forward requests to the nodes of the cluster-based network file server is that the front-end load balancer comprises a single point of failure for the cluster-based network file server. In some cases, the file system protocol used by a server, such as server 125 in FIG. 1, or a hypervisor, such as hypervisor 220 in FIG. 2, to communicate with the storage appliance 135 or storage appliance 110 may not provide a failover mechanism (e.g., NFS Version 3). In the case that no failover mechanism is provided on the client side, the hypervisor may not be able to connect to a new node within a cluster in the event that the node connected to the hypervisor fails.

In some examples, each node in a cluster may be connected to each other via a network and may be associated with one or more IP addresses (e.g., two different IP addresses may be assigned to each node). In one example, each node in the cluster may be assigned a permanent IP address and a floating IP address and may be accessed using either the permanent IP address or the floating IP address. In this case, a hypervisor, such as hypervisor 220 in FIG. 2, may be configured with a first floating IP address associated with a first node in the cluster. The hypervisor may connect to the cluster using the first floating IP address. In one example, the hypervisor may communicate with the cluster using a distributed file system protocol (e.g., NFS Version 3 protocol). One or more nodes in the cluster may run a Virtual Router Redundancy Protocol (VRRP) daemon. A daemon may include a background process. Each VRRP daemon may include a list of all floating IP addresses available within the cluster. In the event that the first node associated with the first floating IP address fails, one of the VRRP daemons may automatically assume or pick up the first floating IP address if no other VRRP daemon has already assumed the first floating IP address. Therefore, if the first node in the cluster fails or otherwise goes down, then one of the remaining VRRP daemons running on the other nodes in the cluster may assume the first floating IP address that is used by the hypervisor for communicating with the cluster.

In order to determine which of the other nodes in the cluster will assume the first floating IP address, a VRRP priority may be established. In one example, given a number (N) of nodes in a cluster from node(0) to node(N−1), for a floating IP address (i), the VRRP priority of node G may be G-i modulo N. In another example, given a number (N) of nodes in a cluster from node(0) to node(N−1), for a floating IP address (i), the VRRP priority of node G may be (i j) modulo N. In these cases, node G will assume floating IP address (i) if its VRRP priority is higher than that of any other node in the cluster that is alive and announcing itself on the network. Thus, if a node fails, then there may be a clear priority ordering for determining which other node in the cluster will take over the failed node's floating IP address.

In some examples, a cluster may include a plurality of nodes and one or more nodes of the plurality of nodes may be assigned a different floating IP address. In such examples, a first hypervisor may be configured with a first floating IP address associated with a first node in the cluster, a second hypervisor may be configured with a second floating IP address associated with a second node in the cluster, and a third hypervisor may be configured with a third floating IP address associated with a third node in the cluster.

As depicted in FIG. 3, the software-level components of the storage appliance 300 may include data management system 355, a virtualization interface 360, a distributed job scheduler 365, a distributed metadata store 370, a distributed file system 375, and one or more virtual machine search indexes, such as virtual machine search index 380. In one example, the software-level components of the storage appliance 300 may be run using a dedicated hardware-based appliance. Additionally or alternatively, the software-level components of the storage appliance 300 may be run from the cloud (e.g., the software-level components may be installed on a cloud service provider).

In some examples, the data storage across a plurality of nodes in a cluster may be aggregated and made available over a single file system namespace (e.g., /snapshots/). For example, the data storage available from the one or more physical machines (e.g., physical machine 305 and physical machine 310) may be made available of a single file system namespace. A directory for each virtual machine protected using the storage appliance 300 may be created (e.g., the directory for Virtual Machine A may be/snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in /snapshots/VM_A/s1/ and a second snapshot of Virtual Machine A may reside in /snapshots/VM_A/s2/).

The distributed file system 375 may present itself as a single file system, so that as new physical machines or nodes are added to the storage appliance 300, the cluster may automatically discover the additional nodes and automatically increase the available capacity of the file system for storing files and other data. Each file stored in the distributed file system 375 may be partitioned into one or more chunks or shards. Each of the one or more chunks may be stored within the distributed file system 375 as a separate file. The files stored within the distributed file system 375 may be replicated or mirrored over a plurality of physical machines, thereby creating a load-balanced and fault tolerant distributed file system. In one example, storage appliance 300 may include ten physical machines arranged as a failover cluster and a first file corresponding with a snapshot of a virtual machine (e.g., /snapshots/VM_A/s1/s1.full) may be replicated and stored on three of the ten machines.

The distributed metadata store 370 may include a distributed database management system that provides high availability without a single point of failure. In one example, the distributed metadata store 370 may comprise a database, such as a distributed document-oriented database. The distributed metadata store 370 may be used as a distributed key value storage system. In one example, the distributed metadata store 370 may include a distributed non-structured query language (NoSQL) key value store database. In some examples, the distributed metadata store 370 may include a partitioned row store, in which rows are organized into tables or other collections of related data held within a structured format within the key value store database. A table (or a set of tables) may be used to store metadata information associated with one or more files stored within the distributed file system 375. The metadata information may include the name of a file, a size of the file, file permissions associated with the file, when the file was last modified, and file mapping information associated with an identification of the location of the file stored within a cluster of physical machines. In one example, a new file corresponding with a snapshot of a virtual machine may be stored within the distributed file system 375 and metadata associated with the new file may be stored within the distributed metadata store 370. The distributed metadata store 370 may also be used to store a backup schedule for the virtual machine and a list of snapshots for the virtual machine that are stored using the storage appliance 300.

In some examples, the distributed metadata store 370 may be used to manage one or more versions of a virtual machine. Each version of the virtual machine may correspond with a full image snapshot of the virtual machine stored within the distributed file system 375 or an incremental snapshot of the virtual machine (e.g., a forward incremental or reverse incremental) stored within the distributed file system 375. In one example, the one or more versions of the virtual machine may correspond with a plurality of files. The plurality of files may include a single full image snapshot of the virtual machine and one or more incremental aspects derived from the single full image snapshot. The single full image snapshot of the virtual machine may be stored using a first storage device of a first type (e.g., a HDD) and the one or more incremental aspects derived from the single full image snapshot may be stored using a second storage device of a second type (e.g., an SSD). In this example, a single full image needs to be stored and each version of the virtual machine may be generated from the single full image or the single full image combined with a subset of the one or more incremental aspects. Further, each version of the virtual machine may be generated by performing a sequential read from the first storage device (e.g., reading a single file from a HDD) to acquire the full image and, in parallel, performing one or more reads from the second storage device (e.g., performing fast random reads from an SSD) to acquire the one or more incremental aspects.

The distributed job scheduler 365 may be used for scheduling backup jobs that acquire and store virtual machine snapshots for one or more virtual machines over time. The distributed job scheduler 365 may follow a backup schedule to back up an entire image of a virtual machine at a particular point in time or one or more virtual disks associated with the virtual machine at the particular point in time. In one example, the backup schedule may specify that the virtual machine be backed up at a snapshot capture frequency, such as every two hours or every 24 hours. A backup job may be associated with one or more tasks to be performed in a sequence. One or more tasks associated with a job may be run on a particular node within a cluster. In some cases, the distributed job scheduler 365 may schedule a specific job to be run on a particular node based on data stored on the particular node. For example, the distributed job scheduler 365 may schedule a virtual machine snapshot job to be run on a node in a cluster that is used to store snapshots of the virtual machine in order to reduce network congestion.

The distributed job scheduler 365 may comprise a distributed fault tolerant job scheduler, in which jobs affected by node failures are recovered and rescheduled to be run on available nodes. In one example, the distributed job scheduler 365 may be fully decentralized and implemented without the existence of a master node. The distributed job scheduler 365 may run job scheduling processes on each node in a cluster or on a plurality of nodes in the cluster. In one example, the distributed job scheduler 365 may run a first set of job scheduling processes on a first node in the cluster, a second set of job scheduling processes on a second node in the cluster, and a third set of job scheduling processes on a third node in the cluster. The first set of job scheduling processes, the second set of job scheduling processes, and the third set of job scheduling processes may store information regarding jobs, schedules, and the states of jobs using a metadata store, such as distributed metadata store 370. In the event that the first node running the first set of job scheduling processes fails (e.g., due to a network failure or a physical machine failure), the states of the jobs managed by the first set of job scheduling processes may fail to be updated within a threshold period of time (e.g., a job may fail to be completed within 30 seconds or within minutes from being started). In response to detecting jobs that have failed to be updated within the threshold period of time, the distributed job scheduler 365 may undo and restart the failed jobs on available nodes within the cluster.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In one example, the job scheduling processes may detect that a particular task for a particular job has failed and in response may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The distributed job scheduler 365 may manage a job in which a series of tasks associated with the job are to be performed atomically (i.e., partial execution of the series of tasks is not permitted). If the series of tasks cannot be completely executed or there is any failure that occurs to one of the series of tasks during execution (e.g., a hard disk associated with a physical machine fails or a network connection to the physical machine fails), then the state of a data management system may be returned to a state as if none of the series of tasks were ever performed. The series of tasks may correspond with an ordering of tasks for the series of tasks and the distributed job scheduler 365 may ensure that each task of the series of tasks is executed based on the ordering of tasks. Tasks that do not have dependencies with each other may be executed in parallel.

In some examples, the distributed job scheduler 365 may schedule each task of a series of tasks to be performed on a specific node in a cluster. In other examples, the distributed job scheduler 365 may schedule a first task of the series of tasks to be performed on a first node in a cluster and a second task of the series of tasks to be performed on a second node in the cluster. In these examples, the first task may have to operate on a first set of data (e.g., a first file stored in a file system) stored on the first node and the second task may have to operate on a second set of data (e.g., metadata related to the first file that is stored in a database) stored on the second node. In some examples, one or more tasks associated with a job may have an affinity to a specific node in a cluster.

In one example, if the one or more tasks require access to a database that has been replicated on three nodes in a cluster, then the one or more tasks may be executed on one of the three nodes. In another example, if the one or more tasks require access to multiple chunks of data associated with a virtual disk that has been replicated over four nodes in a cluster, then the one or more tasks may be executed on one of the four nodes. Thus, the distributed job scheduler 365 may assign one or more tasks associated with a job to be executed on a particular node in a cluster based on the location of data required to be accessed by the one or more tasks.

In one example, the distributed job scheduler 365 may manage a first job associated with capturing and storing a snapshot of a virtual machine periodically (e.g., every 30 minutes). The first job may include one or more tasks, such as communicating with a virtualized infrastructure manager, such as the virtualized infrastructure manager 225 in FIG. 2, to create a frozen copy of the virtual machine and to transfer one or more chunks (or one or more files) associated with the frozen copy to a storage appliance, such as storage appliance 135 in FIG. 1. The one or more tasks may also include generating metadata for the one or more chunks, storing the metadata using the distributed metadata store 370, storing the one or more chunks within the distributed file system 375, and communicating with the virtualized infrastructure manager 225 that the frozen copy of the virtual machine may be unfrozen or released from a frozen state. The metadata for a first chunk of the one or more chunks may include information specifying a version of the virtual machine associated with the frozen copy, a time associated with the version (e.g., the snapshot of the virtual machine was taken at 5:30 p.m. on Jun. 29, 2018), and a file path to where the first chunk is stored within the distributed file system 375 (e.g., the first chunk is located at /snapshotsNM_B/s1/s1.chunk1). The one or more tasks may also include deduplication, compression (e.g., using a lossless data compression algorithm such as LZ4 or LZ77), decompression, encryption (e.g., using a symmetric key algorithm such as Triple DES or AES-256), and decryption related tasks.

The virtualization interface 360 may provide an interface for communicating with a virtualized infrastructure manager managing a virtualization infrastructure, such as virtualized infrastructure manager 225 in FIG. 2, and requesting data associated with virtual machine snapshots from the virtualization infrastructure. The virtualization interface 360 may communicate with the virtualized infrastructure manager using an API for accessing the virtualized infrastructure manager (e.g., to communicate a request for a snapshot of a virtual machine). In this case, storage appliance 300 may request and receive data from a virtualized infrastructure without requiring agent software to be installed or running on virtual machines within the virtualized infrastructure. The virtualization interface 360 may request data associated with virtual blocks stored on a virtual disk of the virtual machine that have changed since a last snapshot of the virtual machine was taken or since a specified prior point in time. Therefore, in some cases, if a snapshot of a virtual machine is the first snapshot taken of the virtual machine, then a full image of the virtual machine may be transferred to the storage appliance 300. However, if the snapshot of the virtual machine is not the first snapshot taken of the virtual machine, then the data blocks of the virtual machine that have changed since a prior snapshot was taken may be transferred to the storage appliance 300.

The virtual machine search index 380 may include a list of files that have been stored using a virtual machine and a version history for each of the files in the list. One or more version of a file may be mapped to the earliest point-in-time snapshot of the virtual machine that includes the version of the file or to a snapshot of the virtual machine that includes the version of the file (e.g., the latest point in time snapshot of the virtual machine that includes the version of the file). In one example, the virtual machine search index 380 may be used to identify a version of the virtual machine that includes a particular version of a file (e.g., a particular version of a database, a spreadsheet, or a word processing document). In some cases, each of the virtual machines that are backed up or protected using storage appliance 300 may have a corresponding virtual machine search index.

In one example, as each snapshot of a virtual machine is ingested, each virtual disk associated with the virtual machine is parsed in order to identify a file system type associated with the virtual disk and to extract metadata (e.g., file system metadata) for each file stored on the virtual disk. The metadata may include information for locating and retrieving each file from the virtual disk. The metadata may also include a name of a file, the size of the file, the last time at which the file was modified, and a content checksum for the file. Each file that has been added, deleted, or modified since a previous snapshot was captured may be determined using the metadata (e.g., by comparing the time at which a file was last modified with a time associated with the previous snapshot). Thus, for every file that has existed within any of the snapshots of the virtual machine, a virtual machine search index (e.g., virtual machine search index 380) may be used to identify when the file was first created (e.g., corresponding with a first version of the file) and at what times the file was modified (e.g., corresponding with subsequent versions of the file). Each version of the file may be mapped to a particular version of the virtual machine that stores that version of the file.

In some examples, if a virtual machine includes a plurality of virtual disks, then a virtual machine search index may be generated for each virtual disk of the plurality of virtual disks. For example, a first virtual machine search index may catalog, and map files located on a first virtual disk of the plurality of virtual disks and a second virtual machine search index may catalog and map files located on a second virtual disk of the plurality of virtual disks. In this case, a global file catalog or a global virtual machine search index for the virtual machine may include the first virtual machine search index and the second virtual machine search index. A global file catalog may be stored for each virtual machine backed up by a storage appliance within a file system, such as distributed file system 375 in FIG. 3.

The data management system 355 may comprise an application running on the storage appliance 300 that manages and stores one or more snapshots of a virtual machine. In one example, the data management system 355 may comprise a highest-level layer in an integrated software stack running on the storage appliance. The integrated software stack may include the data management system 355, the virtualization interface 360, the distributed job scheduler 365, the distributed metadata store 370, and the distributed file system 375.

In some examples, the integrated software stack may run on other computing devices, such as a server or computing device 115 in FIG. 1. The data management system 355 may use the virtualization interface 360, the distributed job scheduler 365, the distributed metadata store 370, and the distributed file system 375 to manage and store one or more snapshots of a virtual machine. One or more snapshots of the virtual machine may correspond with a point-in-time version of the virtual machine. The data management system 355 may generate and manage a list of versions for the virtual machine. One or more versions of the virtual machine may map to or reference one or more chunks and/or one or more files stored within the distributed file system 375. Combined together, the one or more chunks and/or the one or more files stored within the distributed file system 375 may comprise a full image of the version of the virtual machine.

The storage appliance 300 may support data object backup and recovery procedures. For example, the storage appliance 300 may receive or generate snapshots of objects, and the objects may be managed by the storage appliance 300 or by another storage device (e.g., another storage appliance). For example, the storage appliance 300 may store, update, edit, or otherwise modify data of the object, and the data of the object may be stored in the memory 325 and/or the disk 330 of the physical machine 305, the memory 345 and/or disk 350 of the physical machine 310, or both. In some examples, the object corresponds to the distributed file system 375 or a portion thereof. The snapshots associated with the data object may be used for backup and recovery of the data object.

In some examples, before the snapshot is used to recover the data object (e.g., virtual machine), the snapshot is verified or validated. Techniques described herein support snapshot verification using blockchain. When a snapshot is received or generated by the storage appliance 300, the storage appliance may generate a hash value corresponding to the hash value. To generate the hash value, a hash function may receive various metadata associated with the snapshot as inputs, and generate the hash value based on the inputs. The hash value may be stored in the blockchain such that the hash value may be subsequently retrieved for snapshot verification. In response to initiation of a failover recovery procedure, a snapshot may be used to recover the object corresponding to a snapshot. Before recovering the object, the hash value associated with the snapshot may be retrieved from the blockchain and compared to a hash value computed for the snapshot that is to be used for recovery. If the hash values match, then the storage appliance 300 may determine that the snapshot is verified or validated. If the hash values do not match, then the storage appliance 300 may determine that the snapshot is invalid.

Figure 4:
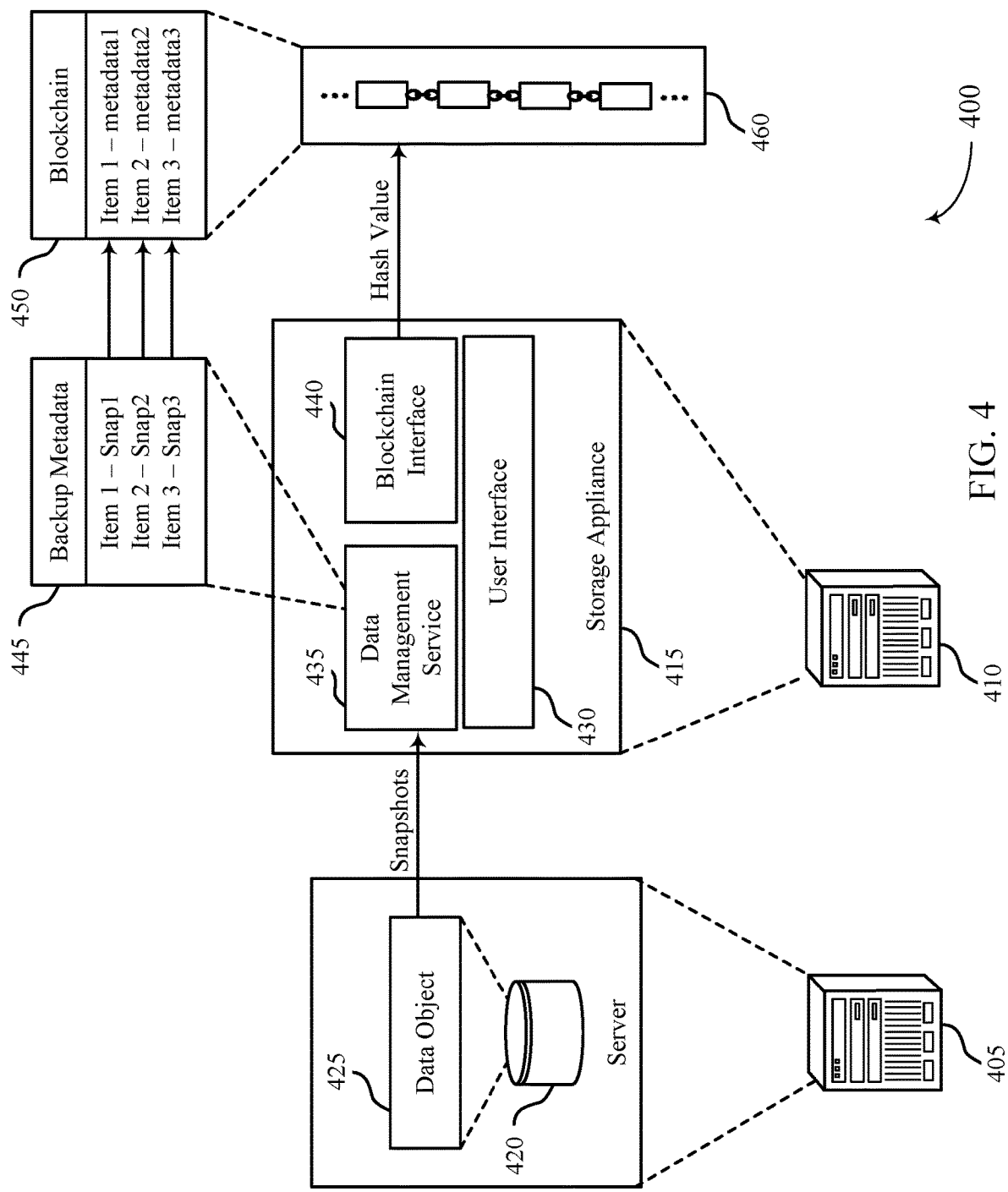
FIG. 4 illustrates an example of a computing environment that supports blockchain for cloud data management in accordance with aspects of the present disclosure.

FIG. 4 illustrates an example of a computing environment 400 that supports blockchain for cloud data management in accordance with aspects of the present disclosure. The computing environment 400 includes a server 405, a computing device 410, and a blockchain 460. The server 405 may be an example of a server or storage appliance as described with respect to FIGS. 1 through 3. The computing device 410 may be an example of a server as described with respect to FIGS. 1 through 3. The computing device 410 may support a storage appliance 415, which may be an example of a storage appliance as described with respect to FIGS. 1 through 3.

The server 405 may represent a set of logical and physical computing systems and may support or access one or more data storage devices 420 for storing various data, such as application data. The data of the data storage device 420 may be accessible via one or more virtual machines supported by the server 405, and the virtual machines may support applications such as web servers, database servers, and application servers. The data may be accessible via these applications and/or virtual machines via one or more data objects, such as data object 425. The data object 425 may represent a virtual disc, a file, a virtual machine, a hard disc drive, a server, or a combination thereof.

As described herein, the data object 425 may be subject to backup and recovery procedures. For example, a virtual machine supported by the server 405 and/or the storage appliance 415 may periodically generate snapshots of the data object 425. The snapshots may represent a full or incremental data image of the data object 425. The snapshots may be redundantly stored at the server 405 and/or the storage appliance 415. If a device or logical system fails, the snapshots may be used to recover the data object 425 at the server 405 or another device via a failover recovery procedure.

In some examples, the snapshots of the data object 425 may be generated or received by a data management service 435 of the storage appliance 415. For example, the data management service 435 may maintain one or backup metadata tables 445 that includes information about snapshots for the data object 425 and snapshots for other data objects supported by the server 405 or other systems. Further, the storage appliance 415 may store the snapshots (e.g., full and incremental) associated with the data object 425 in a data store managed or accessed by the storage appliance 415 and/or in cloud storage system. In some cases, upon failure of a device or system, multiple data objects are to be recovered, as the multiple data objects may support a server, such as server 405 in data management and application support. The storage appliance 415 may maintain groupings of data objects (in addition to backup and recovery configurations) to support backup and recovery in such environments.

The blockchain 460 may be an example of a digital record of transactions, data, or the like. The blockchain 460 may be a public blockchain, a private blockchain, an enterprise blockchain, or a combination thereof. The blockchain 460 may be maintained and verified by a set of computing systems (e.g., nodes) that have access to the blockchain. In some cases, the blockchain 460 may support a virtual machine that supports executable code or programs, which may be referred to as smart contracts. In some examples, the storage appliance 415 is a node that maintains and verifies the blockchain 460.

As described herein, to support security during backup recovery, snapshots may be validated by leveraging blockchain technology. For example, the data management service 435 may use data associated with a snapshot corresponding to data object 425 as an input to a hash function that outputs a hash value. A blockchain interface 440 may be configured to interact with blockchain 460 by reading from the blockchain 460, writing to the blockchain 460, storing data to the blockchain 460, or the like. For example, to write to the blockchain, the blockchain interface may broadcast a transaction to one or more other nodes that support the blockchain, write to a local copy of the blockchain (and share the local copy), or the like. A transaction may include an indication of a recipient (e.g., a public key), a value, data, etc. In some cases, to write to the blockchain, the blockchain interface 440 may call a method or key associated with a smart contract that has been deployed to the blockchain 460.

Thus, upon receipt or generation of each snapshot, or upon a snapshot satisfying a security rule, the data management service 435 may generate the hash value and store the hash value to the blockchain 460. Further, the data management service 435 may store the snapshot or metadata associated with the snapshot in a local or accessible storage system. For example, the data management service 435 may store metadata associated with the snapshot into the backup metadata table 445 and store the data image of the snapshot into a local or accessible storage location. Upon failure of a device (e.g., server 405) or a system (e.g., a virtual machine) supporting data object 425, the data management service 435 may activate a failover recovery procedure that uses a snapshot of the data object 425 to recover the data object at the server 405 or another location.

In some examples, the failover recovery procedure may be automatically performed or may be activated by a user, such as a user accessing a user interface 430 supported by the storage appliance 415. The user may select a snapshot to recover or indicate that the latest snapshot is to be used for recovery. The data management service 435 may access the backup metadata table 445 to identify the snapshots, data associated with the snapshots, and/or a storage location of the snapshot. Additionally, the backup metadata table may be used to identify data that is used to retrieve the hash value associated with the snapshot from the blockchain 460 in order to verify or validate the snapshot.

For example, for verification or validation of a snapshot, the blockchain interface 440 may retrieve the hash value corresponding to the identified snapshot from the blockchain 460. That is, the blockchain interface 440 may read the hash value from the blockchain 460. To identify the appropriate hash value, the blockchain interface 440 may use a transaction identifier, snapshot identifier, user or client identifier, or a combination thereof. In some cases, the information used to identify the appropriate hash value is identified from the backup metadata table 445. Additionally, the data management service 435 and/or the blockchain interface 440 may retrieve or generate a hash value associated with the snapshot as stored or accessed locally. That is, in some examples, upon generation or receipt of the initial snapshot and storage of the hash value to the blockchain, a copy of the hash value may be stored locally in association with the snapshot. For example, a copy of the hash value may be stored in the backup metadata table. In the same or alternative examples, the locally retrieved hash value may be generated during the failover recovery procedure. More particularly, data associated with the snapshot that is to be used for recovering the data object 425 may be input into the hash function to generate a new hash value.

To verify or validate the snapshot, the data management service 435 may compare the hash value retrieved from the blockchain 450 to the hash value generated or identified locally to determine whether the snapshot is unmodified, and thus verified or validated. If the hash values are different, then the snapshot is not verified or not validated, and thus may not be used to recover the data object 425 in the state corresponding to the snapshot. In such cases, another snapshot may be identified and used for recovery (after verification or validation).

Thus, using these techniques, security of data backup and recovery may be improved. By leveraging the immutable, trustless, tamper-proof, and decentralized characteristics of blockchain technology, users and organizations may ensure that data backups and recovery procedures are secure and functioning properly. In some examples, the blockchain 460 may store or represent a series of backups (snapshots) and the series of backups may be used to verify that the backup procedures satisfy or adhere to service level agreements.

Various techniques may be further used to improve the security and efficiencies of computing environment 400. As described herein, the hash value of the data image may not be generated and stored to the blockchain, as hashing a data image may be utilize significant processing and memory resources. Rather, metadata associated with the snapshot may be used as input into the hash function. For example, a row corresponding to a particular snapshot of the backup metadata table 445 may be used as an input into the hash function to generate the hash value that is stored to the blockchain 460. Additionally, data that may be hashed may be a customer number, customer name, user number, username, a hash of the snapshot, a timestamp associated with the hashing or the snapshot, and a backup identifier (e.g., snapshot identifier). Thus, the metadata of the snapshot is tamper-proof and may be used to verify the validate the validate of the data present in the backups. Further, the domain polices of the backup catalog (e.g., metadata of the backup) may be used as input into the hash function.

In some examples, the data object 425 may correspond to a set of files. The data management service 435 may generate or access a catalog of the files, and the catalog may contain a hash of the files and folders of the data object 425. The catalog of files (containing the hash of each file) may be hashed to produce the hash value that is stored to the blockchain 460. Again, this technique may avoid using the entire data image or storing each file hash to the blockchain 460, which may use significant processing resources as well as blockchain resources. Further, some blockchain systems charge (e.g., via cryptocurrency or "gas" payment) per transaction and the amount of data used in such transactions, and as such, limiting the amount of data or limiting the amount of transactions may be beneficial. Integrity verification in this case may include comparing a local database hash value to the hash value stored to the blockchain for a given timestamp to ensure that the data has not been subject to tampering.

In some examples, the snapshots represent a filesystem block change sets, such that the snapshots represent incremental changes. Thus, the file/folder level changes may be stored in a database local to the storage appliance 415 and the snapshot level image hash (e.g., a hash of the metadata of the snapshot) is stored to the blockchain 460.

Figure 5:
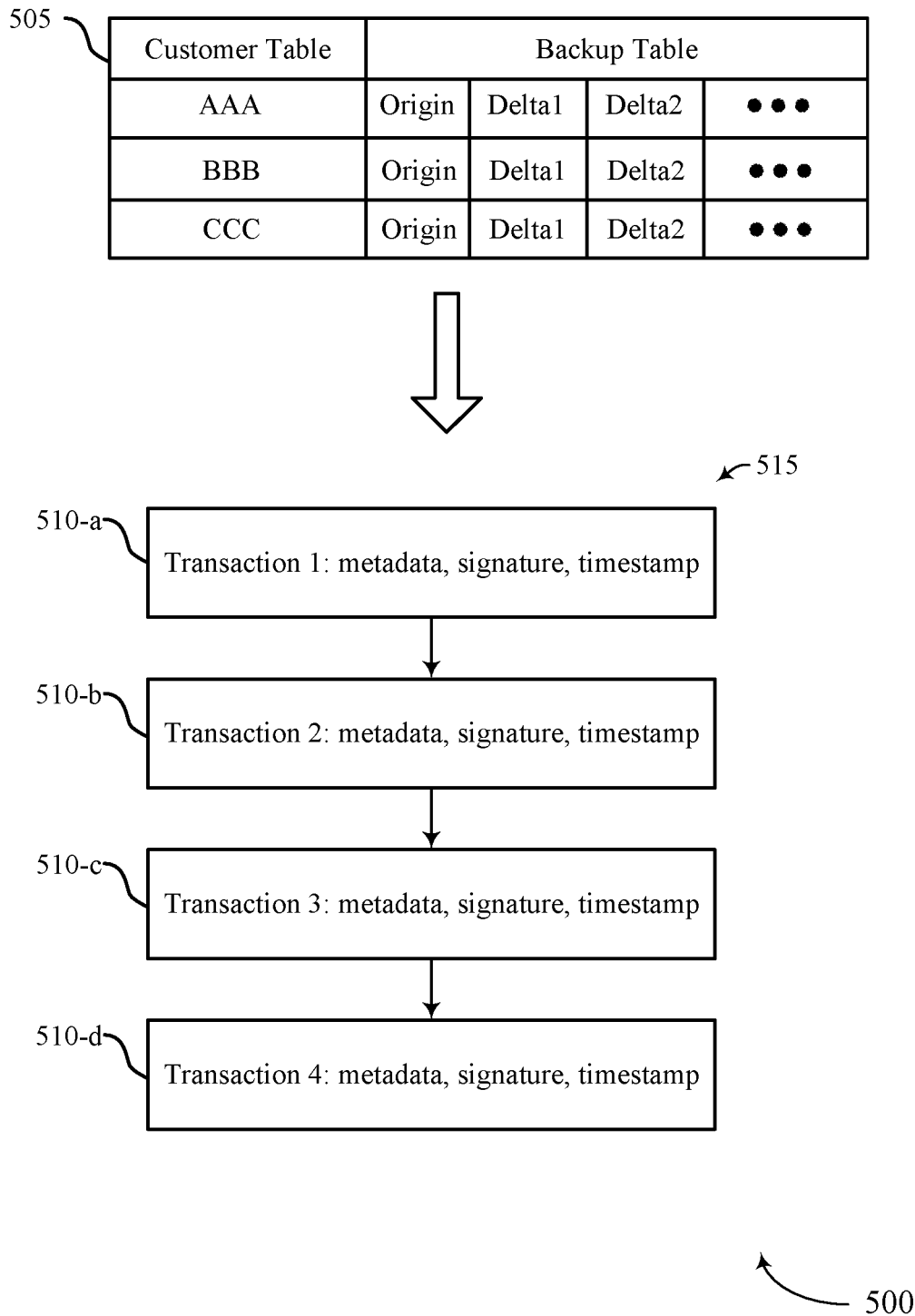
FIG. 5 illustrates an example of a transaction diagram that illustrates blockchain for cloud data management in accordance with aspects of the present disclosure.

As described in further detail with respect to FIG. 5, the storage appliance 415 (or an associated entity) may be associated with a certificate or a public and private key pair. The storage appliance 415 may digitally sign the hash value using the private key. The digital signature may be used to verify the provenance of the hash value and thus the provenance of the associated snapshot. That is, a device or user may verify the signature using the public key associated with the storage appliance 415 to determine that the storage appliance maintains and stores the snapshot.

The user interface 430 may be used by a user to access and configure backups and recoveries as well as to monitor backup and recovery procedures. In some examples, the user interface 430 may be accessed by a user to activate the blockchain data management and security techniques described herein as well as to verify snapshots before activating recovery procedures. Additionally, the user interface, in conjunction with the blockchain interface 440 may read data from the blockchain 460 to determine and verify adherence to service level agreements associated with data backup and recovery.

In some examples, the snapshot or the metadata associated with the snapshot is encrypted and a key that is used to encrypt the snapshot or metadata is stored to the blockchain 460 in association with the hash value. Upon recovery and snapshot validation, the key may be retrieved from the blockchain and used to decrypt the snapshot for validation and/or recovery. This technique may provide another layer of data security for snapshots and backup/recovery procedures.

FIG. 5 illustrates an example of a transition diagram 500 that illustrates blockchain for cloud data management in accordance with aspects of the present disclosure. The transition diagram illustrates examples of data processing that may be performed by aspects of FIGS. 1 through 3. The transition diagram 500 includes a backup metadata table 505 and a diagram of a blockchain 515. The backup metadata table 505 may be maintained by a storage appliance as described with respect to FIGS. 1 through 4. In some cases, a storage appliance may maintain backups for a set of customers or entities, and as such, may maintain the backup metadata table 505 that corresponds to multiple customers.

The backup metadata table 505 includes a set of rows, where each row corresponding to a customer (e.g., customer "AAA") and various fields of the "Backup Table" portion of the backup metadata table 505 correspond to backups or snapshots of an object. Each backup row includes an "Origin" backup which may correspond to a first data image backup of a data object (e.g., virtual machine, virtual disc, server, file), and a "Delta" backup may correspond to an incremental snapshot or backup as described herein.

In some examples, an origin backup may be an example of a golden backup or golden snapshot. The golden backup may be an immutable template file that includes various configurations and settings for the data object. The immutable template file may not include user or customer data, but configuration data. The configuration data may include network certificates, network configurations, server configurations, application configurations, operating system configurations, etc. A backup or snapshot of the immutable template file may be used to recover a data object in an "empty" or clean state (e.g., without user data) but in such a state that it is ready to be used to store and access user data. Thus, metadata associated with the origin backup may be hashed to produce a hash value that is stored to the blockchain 515. The hash of the origin backup may be used to verify or validate the origin backup. Thus, the origin backup and the associated hash value stored in the blockchain may function as a baseline source of truth for a data object. In some cases, a golden backup may be an object image that is stored and locked. A user or administrator may choose the data files that are to be backed up for the golden image and used for audit and point in time recovery. Thus, in some cases, a golden image may contain some user data as content.

The blockchain 515 includes a set of transactions 510, where each transactions may correspond to a backup snapshot. For example, the transaction 510-a may correspond to the origin backup for customer AAA as illustrated in the backup metadata table 505. Each transaction 510 may include metadata, a signature (e.g., associated with the storage appliance or customer), and a timestamp. The metadata may be a hash value of metadata associated with a snapshot as described herein. Further, the signature may be used to verify the provenance of the transaction, and the timestamp may be used to retrieve the data for snapshot verification.

The transactions 510 may be stored in the same block (e.g., the same set of transactions that are hashed) or in different blocks in the blockchain 515. In some examples, each transaction is a separately hashed block of the blockchain 515. As described herein, in cases where the blockchain 515 is a public blockchain supporting various techniques, the various blocks of the blockchain 515 may include other data and other types of transactions that are different from backup hash value transactions.

Figure 6:
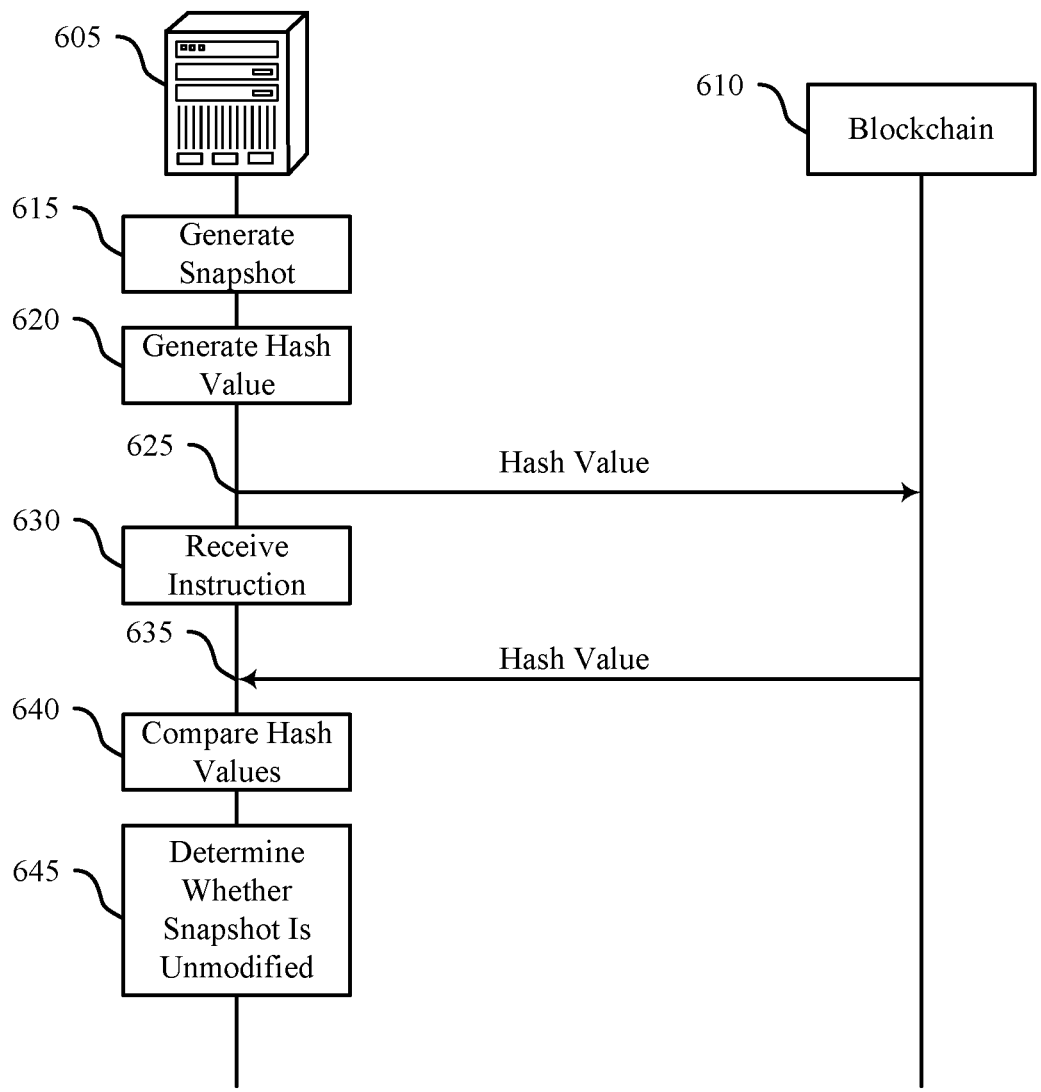
FIG. 6 illustrates an example of a process flow that supports blockchain for cloud data management in accordance with aspects of the present disclosure.

FIG. 6 illustrates an example of a process flow 600 that supports blockchain for cloud data management in accordance with aspects of the present disclosure. The process flow 600 includes a storage appliance 605 and a blockchain 610, which may be examples of corresponding devices as described with respect to FIGS. 1 through 5.

In some examples, the operations illustrated in the process flow 600 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 615, the storage appliance 605 may generate a first snapshot of a first state of a data object managed by a data management system. The data object may be an example of a virtual machine, a virtual disc, a hard disc drive, a server, a virtual desktop, a file, an immutable template file, or any combination thereof. The snapshot may capture a data image of the data object.

At 620, the storage appliance 605 may generate, using metadata associated with the first snapshot of the first state, a first hash value. In some examples, the hash value is generated using a row, or a portion thereof, or a backup metadata table. In some examples, the hash value is generated using a backup file catalog that contains a hash of files and folders of the data object. In some examples, the metadata associated with the snapshot includes unique identifiers for a plurality of files of the data object. The unique identifiers may be file names, headings within the file, headers within the file, file attributes, or a combination thereof.

At 625, the storage appliance 605 may store the first hash value to the blockchain 610. Storing the hash value may include executing a transaction such that the transaction includes the hash value and is reflected in the blockchain data. Storing the first hash value may also include calling a method or procedure specified in a smart contract supported by the blockchain.

At 630, the storage appliance 605 may receive an instruction to recover the first state of the data object using the first snapshot. The instruction may be received via a user interface supported by the storage appliance 605. In some cases, a user may select the first snapshot for recovery, or the first snapshot may be identified for recovery.

At 635, the storage appliance 605 may retrieve the first hash value from the blockchain based at least in part on the instruction to recover the first state of the data object using the first snapshot. Retrieving the hash value may include reading the hash value from the blockchain or reading a transaction that includes the value and parsing the transaction to identify the value.

At 640, the storage appliance 605 may compare the first hash value retrieved from the blockchain to a second hash value of the metadata associated with the first snapshot. The second hash value may be generated in response to receiving the instruction to recover the first state of the data object using the first snapshot. In some examples, the second hash value may be stored in association with the first snapshot (e.g., in a snapshot metadata table).

At 645, the storage appliance 605 may determine, based at least in part on a result of the comparing, whether the first snapshot stored in the data management system is unmodified. For example, if the snapshot or the metadata associated with the snapshot is modified, then the hash value generated will be different. If the hash values match, then the snapshot may not be modified and is thus verified or validated. The storage appliance 605 may then recover the data object on a target device using the first snapshot.

Figure 7:
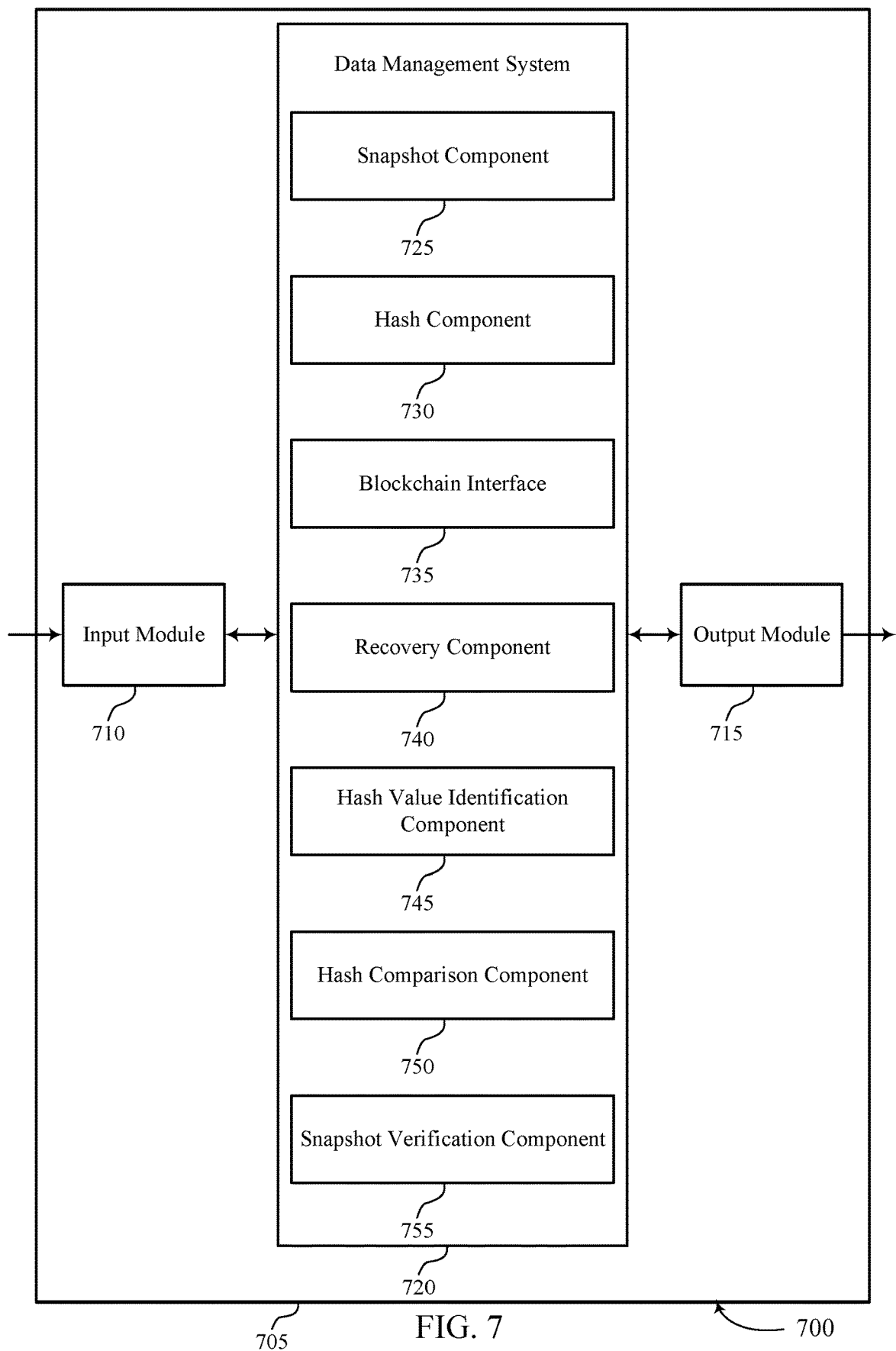
FIG. 7 shows a block diagram of an apparatus that supports blockchain for cloud data management in accordance with aspects of the present disclosure.

FIG. 7 shows a block diagram 700 of a device 705 that supports blockchain for cloud data management in accordance with aspects of the present disclosure. The device 705 may include an input module 710, an output module 715, and a data management system 720. The device 705 may also include a processor. Each of these components may be in communication with one another (e.g., via one or more buses).

The input module 710 may manage input signals for the device 705. For example, the input module 710 may identify input signals based on an interaction with a modem, a keyboard, a mouse, a touchscreen, or a similar device. These input signals may be associated with user input or processing at other components or devices. In some cases, the input module 710 may utilize an operating system such as iOS®, ANDROID®, MS-DOS®, MS-WINDOWS®, OS/2®, UNIX®, LINUX®, or another known operating system to handle input signals. The input module 710 may send aspects of these input signals to other components of the device 705 for processing. For example, the input module 710 may transmit input signals to the data management system 720 to support blockchain for cloud data management. In some cases, the input module 710 may be a component of an network interface 910 as described with reference to FIG. 9.

The output module 715 may manage output signals for the device 705. For example, the output module 715 may receive signals from other components of the device 705, such as the data management system 720, and may transmit these signals to other components or devices. In some examples, the output module 715 may transmit output signals for display in a user interface, for storage in a database or data store, for further processing at a server or server cluster, or for any other processes at any number of devices or systems. In some cases, the output module 715 may be a component of an network interface 910 as described with reference to FIG. 9.

For example, the data management system 720 may include a snapshot component 725, a hash component 730, a blockchain interface 735, a recovery component 740, a hash value identification component 745, a hash comparison component 750, a snapshot verification component 755, or any combination thereof. In some examples, the data management system 720, or various components thereof, may be configured to perform various operations (e.g., receiving, monitoring, transmitting) using or otherwise in cooperation with the input module 710, the output module 715, or both. For example, the data management system 720 may receive information from the input module 710, send information to the output module 715, or be integrated in combination with the input module 710, the output module 715, or both to receive information, transmit information, or perform various other operations as described herein.

The data management system 720 may support data management in accordance with examples as disclosed herein. The snapshot component 725 may be configured as or otherwise support a means for generating a first snapshot of a first state of a data object managed by a data management system. The hash component 730 may be configured as or otherwise support a means for generating, using metadata associated with the first snapshot of the first state, a first hash value. The blockchain interface 735 may be configured as or otherwise support a means for storing the first hash value to a blockchain. The recovery component 740 may be configured as or otherwise support a means for receiving an instruction to recover the first state of the data object using the first snapshot. The hash value identification component 745 may be configured as or otherwise support a means for retrieving the first hash value from the blockchain based on the instruction to recover the first state of the data object using the first snapshot. The hash comparison component 750 may be configured as or otherwise support a means for comparing the first hash value retrieved from the blockchain to a second hash value of the metadata associated with the first snapshot. The snapshot verification component 755 may be configured as or otherwise support a means for determining, based on a result of the comparing, whether the first snapshot stored in the data management system is unmodified.

Figure 8:
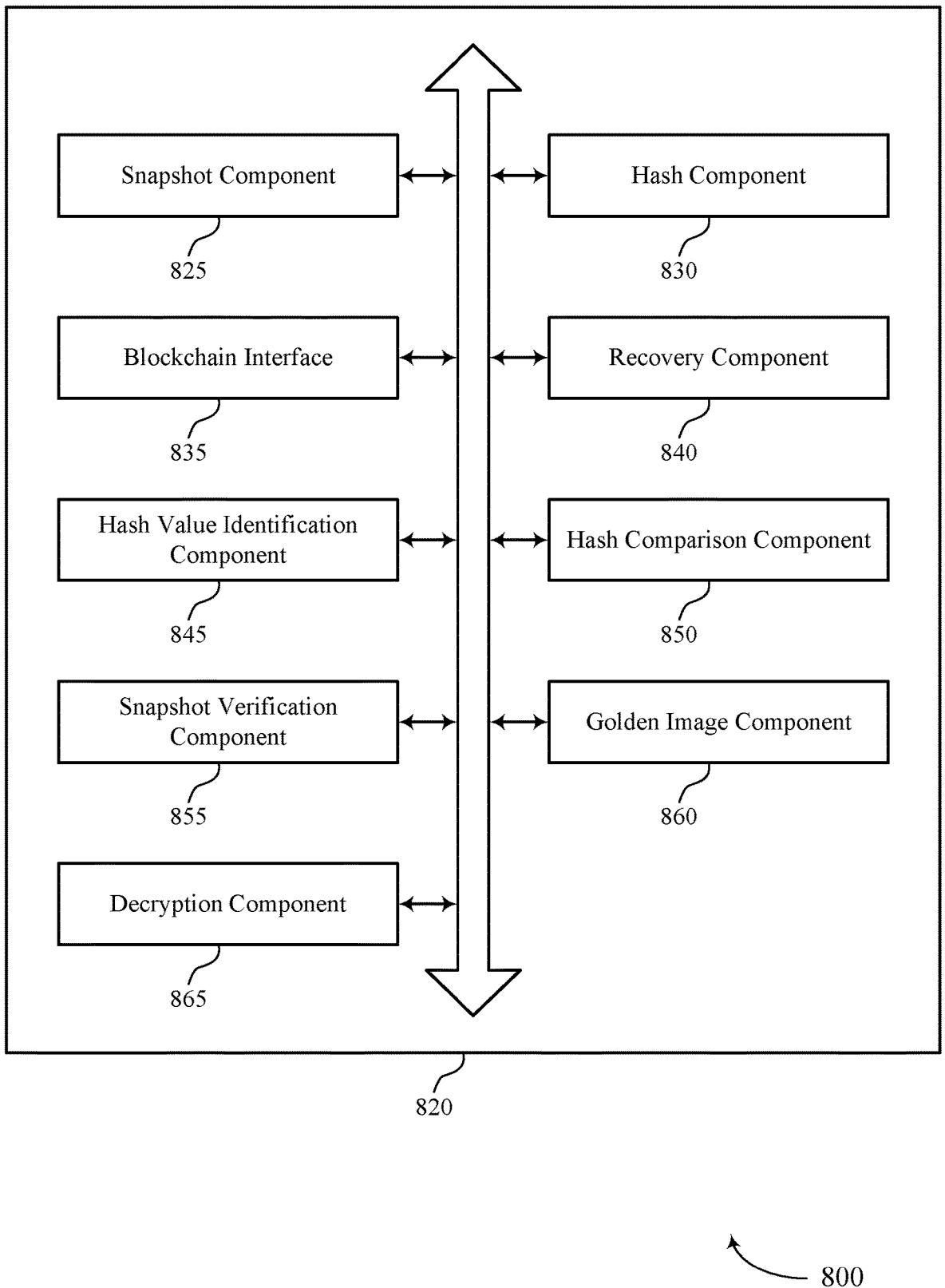
FIG. 8 shows a block diagram of a data management system that supports blockchain for cloud data management in accordance with aspects of the present disclosure.

FIG. 8 shows a block diagram 800 of a data management system 820 that supports blockchain for cloud data management in accordance with aspects of the present disclosure. The data management system 820 may be an example of aspects of a data management system or a data management system 720, or both, as described herein. The data management system 820, or various components thereof, may be an example of means for performing various aspects of blockchain for cloud data management as described herein. For example, the data management system 820 may include a snapshot component 825, a hash component 830, a blockchain interface 835, a recovery component 840, a hash value identification component 845, a hash comparison component 850, a snapshot verification component 855, a golden image component 860, a decryption component 865, or any combination thereof. Each of these components may communicate, directly or indirectly, with one another (e.g., via one or more buses).

The data management system 820 may support data management in accordance with examples as disclosed herein. The snapshot component 825 may be configured as or otherwise support a means for generating a first snapshot of a first state of a data object managed by a data management system. The hash component 830 may be configured as or otherwise support a means for generating, using metadata associated with the first snapshot of the first state, a first hash value. The blockchain interface 835 may be configured as or otherwise support a means for storing the first hash value to a blockchain. The recovery component 840 may be configured as or otherwise support a means for receiving an instruction to recover the first state of the data object using the first snapshot. The hash value identification component 845 may be configured as or otherwise support a means for retrieving the first hash value from the blockchain based on the instruction to recover the first state of the data object using the first snapshot. The hash comparison component 850 may be configured as or otherwise support a means for comparing the first hash value retrieved from the blockchain to a second hash value of the metadata associated with the first snapshot. The snapshot verification component 855 may be configured as or otherwise support a means for determining, based on a result of the comparing, whether the first snapshot stored in the data management system is unmodified.

In some examples, the first snapshot is of an immutable template file of the data object, and the first hash value is generated based at least in part on the immutable template file.

In some examples, the data object is a virtual machine, a virtual disc, a hard disc drive, a server, a virtual desktop, or any combination thereof.

In some examples, the immutable template file includes network certificates, network configurations, server configurations, application configurations, operating system configurations, or any combination thereof.

In some examples, the blockchain interface 835 may be configured as or otherwise support a means for storing, to the blockchain, a key associated with the first snapshot, where the key is stored to the blockchain in association with the first hash value. In some examples, the hash value identification component 845 may be configured as or otherwise support a means for retrieving, based on the instruction to recover the first state, the key from the blockchain. In some examples, the decryption component 865 may be configured as or otherwise support a means for decrypting the first snapshot using the key retrieved from the blockchain.

In some examples, to support generating the first snapshot, the snapshot component 825 may be configured as or otherwise support a means for generating the first snapshot of the data object by a storage appliance of the data management system that manages the data object.

In some examples, to support generating the first hash value, the hash component 830 may be configured as or otherwise support a means for generating the first hash value using a row of a backup metadata table for the data object.

In some examples, the metadata associated with the first snapshot includes one or more unique identifiers for a set of multiple files of the data object.

In some examples, the metadata associated with the first snapshot does not include a full image captured by the first snapshot.

In some examples, the first hash value is generated based exclusively on one or more inputs that exclude the full image captured by the first snapshot, the one or more inputs including the metadata associated with the first snapshot.

In some examples, the blockchain is a private blockchain managed by the data management system.

Figure 9:
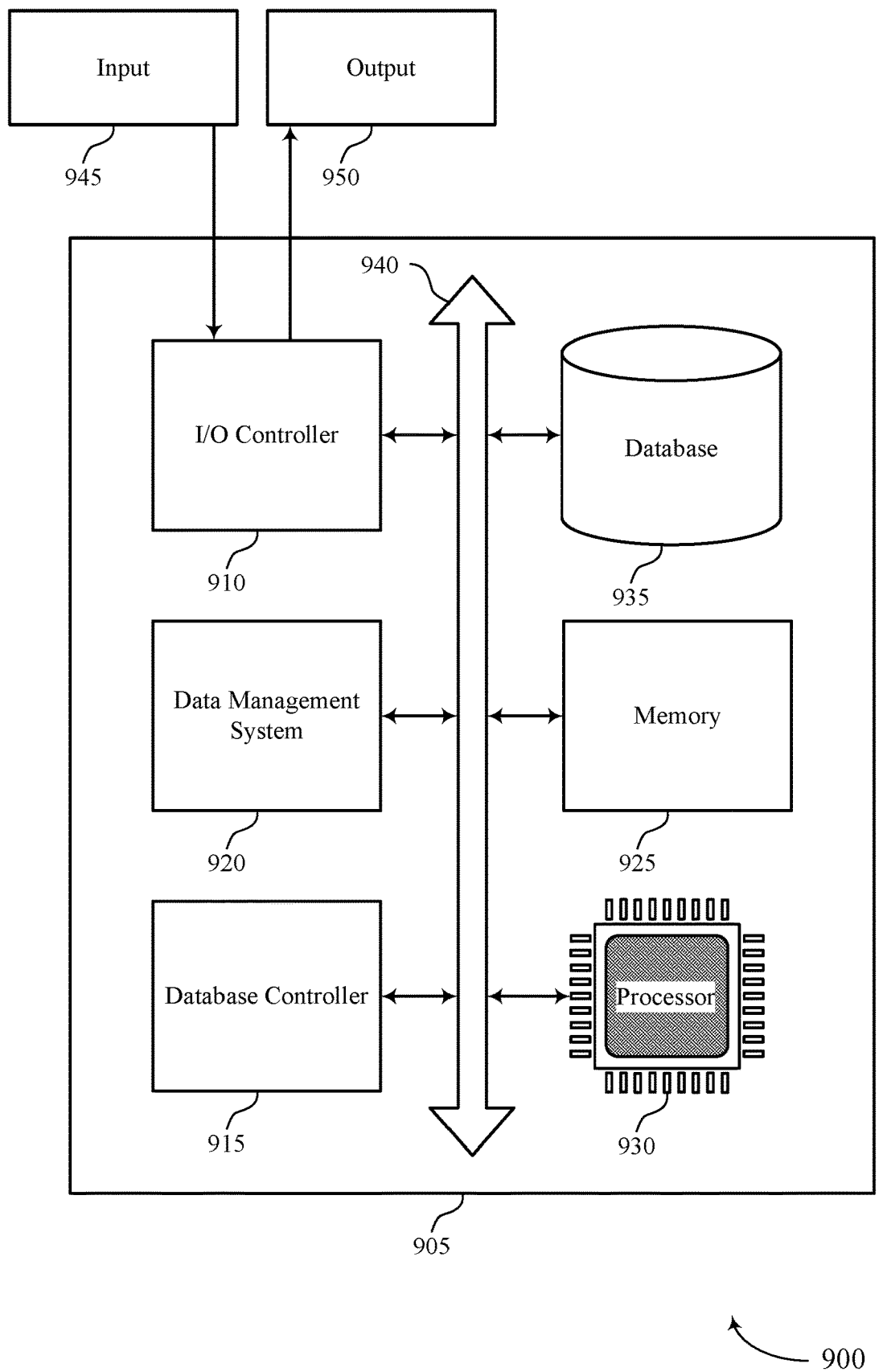
FIG. 9 shows a diagram of a system including a device that supports blockchain for cloud data management in accordance with aspects of the present disclosure.

FIG. 9 shows a diagram of a system 900 including a device 905 that supports blockchain for cloud data management in accordance with aspects of the present disclosure. The device 905 may be an example of or include the components of a device 705 as described herein. The device 905 may include components for data management and security, such as a data management system 920, an network interface 910, a storage controller 915, a memory 925, a processor 930, and a database 935. These components may be in electronic communication or otherwise coupled (e.g., operatively, communicatively, functionally, electronically, electrically) via one or more buses (e.g., a bus 940).

The network interface 910 may manage input signals 945 and output signals 950 for the device 905. The network interface 910 may also manage communications with data sources not integrated into the device 905. In some cases, the network interface 910 may represent a physical connection, a wired connection, a wireless connection, or port to an external peripheral. In some cases, the network interface 910 may utilize an operating system such as iOS®, ANDROID®, MS-DOS®, MS-WINDOWS®, OS/2®, UNIX®, LINUX®, or another known operating system. In other cases, the network interface 910 may represent or interact with one or more data sources (e.g., servers, data storage appliances, databases, cloud storage systems) or one or more devices or peripherals such as a modem, a keyboard, a mouse, a touchscreen, or a similar device. In some cases, the network interface 910 may be implemented as part of a processor 930. In some examples, a user may interact with the device 905 via the network interface 910 or via hardware components controlled by the network interface 910.

The storage controller 915 may manage data storage and processing in a database 935. In some cases, a user may interact with the storage controller 915. In other cases, the storage controller 915 may operate automatically without user interaction. The database 935 may be an example of a single database, a distributed database, multiple distributed databases, a data store, a data lake, or an emergency backup database.

Memory 925 may include random-access memory (RAM) and ROM. The memory 925 may store computer-readable, computer-executable software including instructions that, when executed, cause the processor 930 to perform various functions described herein. In some cases, the memory 925 may contain, among other things, a BIOS which may control basic hardware or software operation such as the interaction with peripheral components or devices.

The processor 930 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 930 may be configured to operate a memory array using a memory controller. In other cases, a memory controller may be integrated into the processor 930. The processor 930 may be configured to execute computer-readable instructions stored in a memory 925 to perform various functions (e.g., functions or tasks supporting blockchain for cloud data management).

The data management system 920 may support data management in accordance with examples as disclosed herein. For example, the data management system 920 may be configured as or otherwise support a means for generating a first snapshot of a first state of a data object managed by a data management system. The data management system 920 may be configured as or otherwise support a means for generating, using metadata associated with the first snapshot of the first state, a first hash value. The data management system 920 may be configured as or otherwise support a means for storing the first hash value to a blockchain. The data management system 920 may be configured as or otherwise support a means for receiving an instruction to recover the first state of the data object using the first snapshot. The data management system 920 may be configured as or otherwise support a means for retrieving the first hash value from the blockchain based on the instruction to recover the first state of the data object using the first snapshot. The data management system 920 may be configured as or otherwise support a means for comparing the first hash value retrieved from the blockchain to a second hash value of the metadata associated with the first snapshot. The data management system 920 may be configured as or otherwise support a means for determining, based on a result of the comparing, whether the first snapshot stored in the data management system is unmodified.

By including or configuring the data management system 920 in accordance with examples as described herein, the device 905 may support techniques for data management including backup and recovery using blockchain as a source of truth for backup snapshots. These techniques may improve data security.

Figure 10:
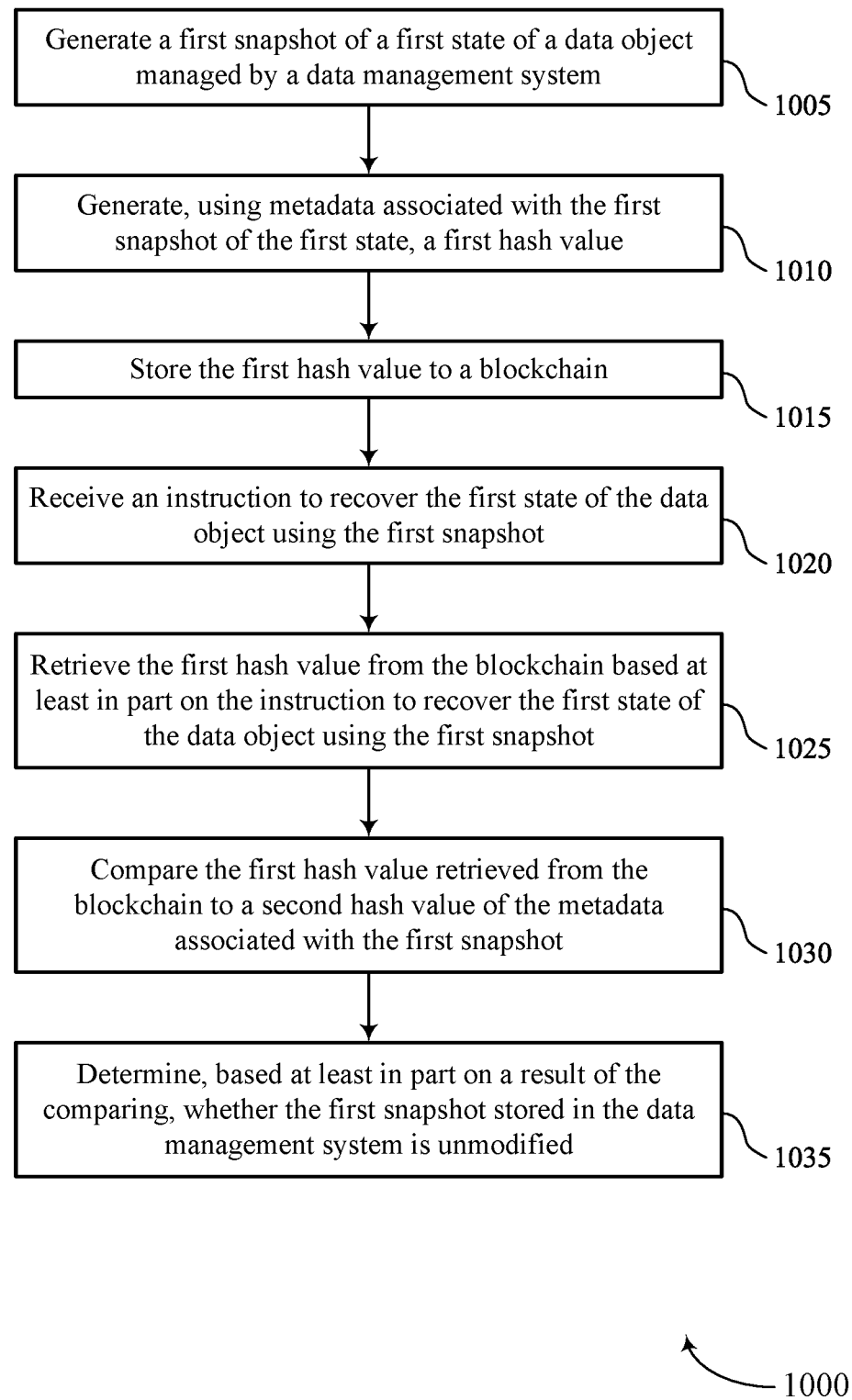
FIGS. 10 through 12 show flowcharts illustrating methods that support blockchain for cloud data management in accordance with aspects of the present disclosure.

FIG. 10 shows a flowchart illustrating a method 1000 that supports blockchain for cloud data management in accordance with aspects of the present disclosure. The operations of the method 1000 may be implemented by a server or its components as described herein. For example, the operations of the method 1000 may be performed by a server as described with reference to FIGS. 1 through 9. In some examples, a server may execute a set of instructions to control the functional elements of the server to perform the described functions. Additionally, or alternatively, the server may perform aspects of the described functions using special-purpose hardware.

At 1005, the method may include generating a first snapshot of a first state of a data object managed by a data management system. The operations of 1005 may be performed in accordance with examples as disclosed herein. In some examples, aspects of the operations of 1005 may be performed by a snapshot component 825 as described with reference to FIG. 8.

At 1010, the method may include generating, using metadata associated with the first snapshot of the first state, a first hash value. The operations of 1010 may be performed in accordance with examples as disclosed herein. In some examples, aspects of the operations of 1010 may be performed by a hash component 830 as described with reference to FIG. 8.

At 1015, the method may include storing the first hash value to a blockchain. The operations of 1015 may be performed in accordance with examples as disclosed herein. In some examples, aspects of the operations of 1015 may be performed by a blockchain interface 835 as described with reference to FIG. 8.

At 1020, the method may include receiving an instruction to recover the first state of the data object using the first snapshot. The operations of 1020 may be performed in accordance with examples as disclosed herein. In some examples, aspects of the operations of 1020 may be performed by a recovery component 840 as described with reference to FIG. 8.

At 1025, the method may include retrieving the first hash value from the blockchain based on the instruction to recover the first state of the data object using the first snapshot. The operations of 1025 may be performed in accordance with examples as disclosed herein. In some examples, aspects of the operations of 1025 may be performed by a hash value identification component 845 as described with reference to FIG. 8.

At 1030, the method may include comparing the first hash value retrieved from the blockchain to a second hash value of the metadata associated with the first snapshot. The operations of 1030 may be performed in accordance with examples as disclosed herein. In some examples, aspects of the operations of 1030 may be performed by a hash comparison component 850 as described with reference to FIG. 8.

At 1035, the method may include determining, based on a result of the comparing, whether the first snapshot stored in the data management system is unmodified. The operations of 1035 may be performed in accordance with examples as disclosed herein. In some examples, aspects of the operations of 1035 may be performed by a snapshot verification component 855 as described with reference to FIG. 8.

Figure 11:
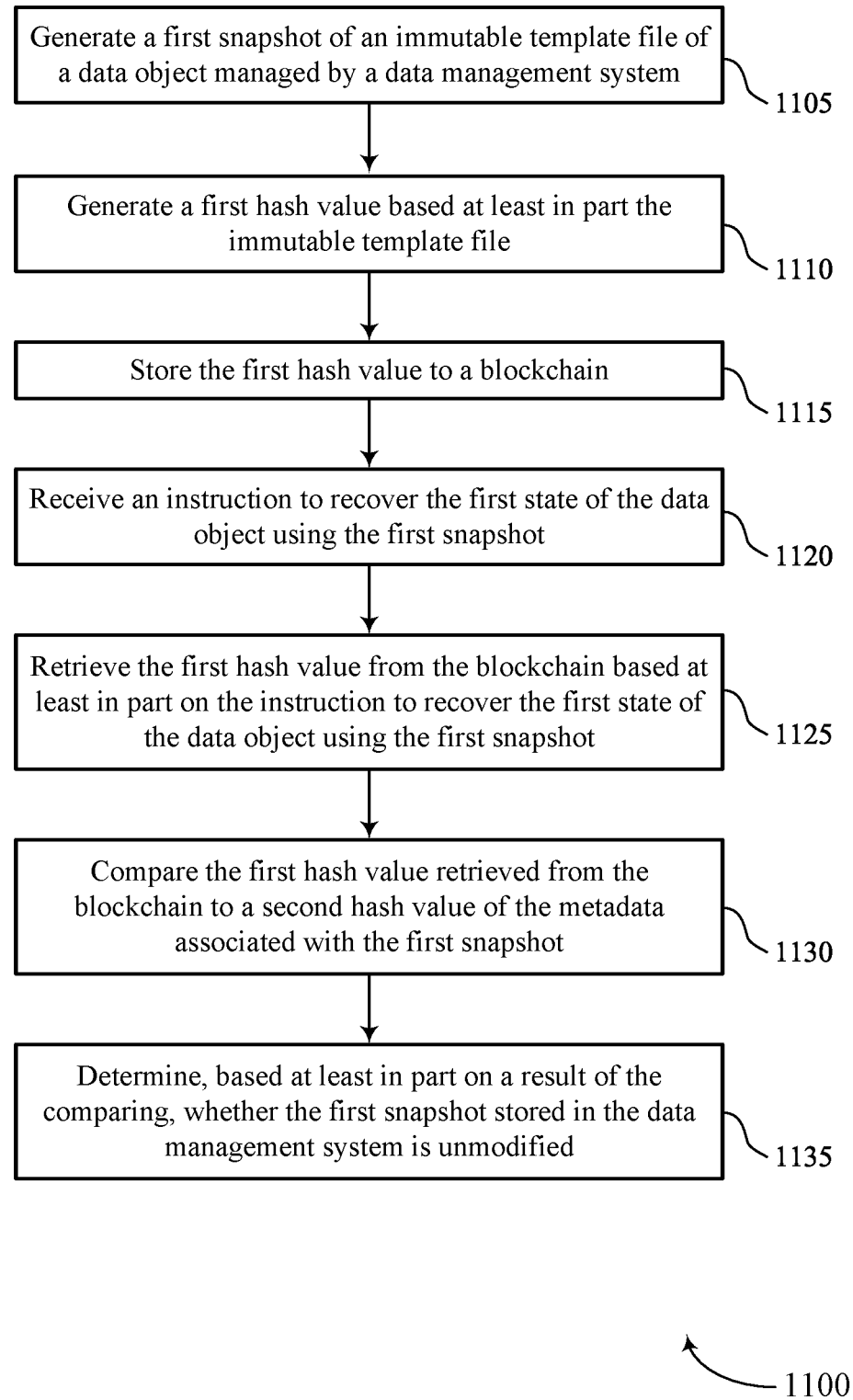

FIG. 11 shows a flowchart illustrating a method 1100 that supports blockchain for cloud data management in accordance with aspects of the present disclosure. The operations of the method 1100 may be implemented by a server or its components as described herein. For example, the operations of the method 1100 may be performed by a server as described with reference to FIGS. 1 through 9. In some examples, a server may execute a set of instructions to control the functional elements of the server to perform the described functions. Additionally, or alternatively, the server may perform aspects of the described functions using special-purpose hardware.

At 1105, the method may include generating a first snapshot of an immutable template file of a data object managed by a data management system. The operations of 1105 may be performed in accordance with examples as disclosed herein. In some examples, aspects of the operations of 1105 may be performed by a snapshot component 825 as described with reference to FIG. 8.

At 1110, the method may include generating a first hash value based at least in part on the immutable template file. The operations of 1110 may be performed in accordance with examples as disclosed herein. In some examples, aspects of the operations of 1110 may be performed by a hash component 830 as described with reference to FIG. 8.

At 1115, the method may include storing the first hash value to a blockchain. The operations of 1115 may be performed in accordance with examples as disclosed herein. In some examples, aspects of the operations of 1115 may be performed by a blockchain interface 835 as described with reference to FIG. 8.

At 1120, the method may include receiving an instruction to recover the first state of the data object using the first snapshot. The operations of 1120 may be performed in accordance with examples as disclosed herein. In some examples, aspects of the operations of 1120 may be performed by a recovery component 840 as described with reference to FIG. 8.

At 1125, the method may include retrieving the first hash value from the blockchain based on the instruction to recover the first state of the data object using the first snapshot. The operations of 1125 may be performed in accordance with examples as disclosed herein. In some examples, aspects of the operations of 1125 may be performed by a hash value identification component 845 as described with reference to FIG. 8.

At 1130, the method may include comparing the first hash value retrieved from the blockchain to a second hash value of the metadata associated with the first snapshot. The operations of 1130 may be performed in accordance with examples as disclosed herein. In some examples, aspects of the operations of 1130 may be performed by a hash comparison component 850 as described with reference to FIG. 8.

At 1135, the method may include determining, based on a result of the comparing, whether the first snapshot stored in the data management system is unmodified. The operations of 1135 may be performed in accordance with examples as disclosed herein. In some examples, aspects of the operations of 1135 may be performed by a snapshot verification component 855 as described with reference to FIG. 8.

Figure 12:
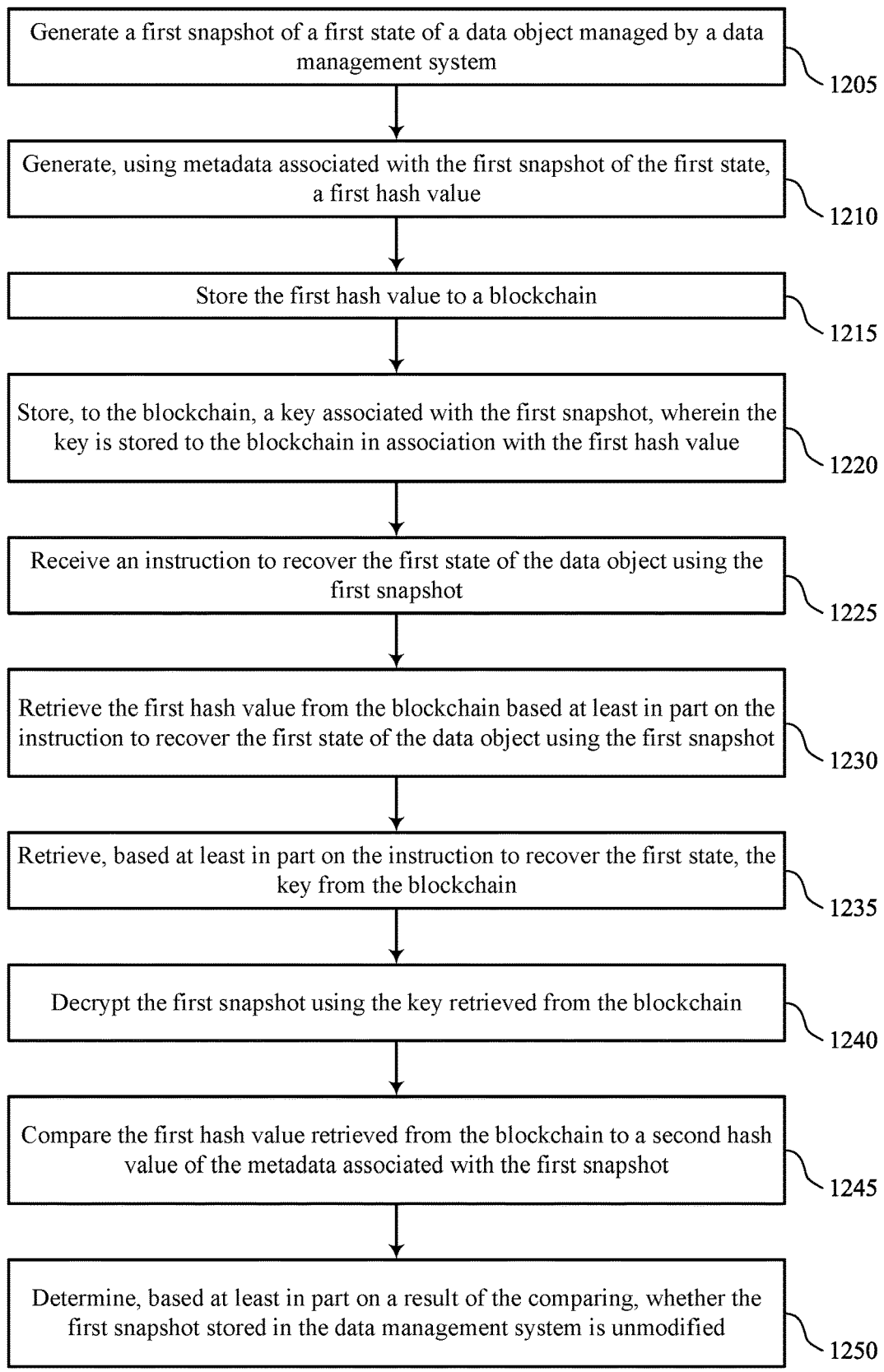

FIG. 12 shows a flowchart illustrating a method 1200 that supports blockchain for cloud data management in accordance with aspects of the present disclosure. The operations of the method 1200 may be implemented by a server or its components as described herein. For example, the operations of the method 1200 may be performed by a server as described with reference to FIGS. 1 through 9. In some examples, a server may execute a set of instructions to control the functional elements of the server to perform the described functions. Additionally, or alternatively, the server may perform aspects of the described functions using special-purpose hardware.

At 1205, the method may include generating a first snapshot of a first state of a data object managed by a data management system. The operations of 1205 may be performed in accordance with examples as disclosed herein. In some examples, aspects of the operations of 1205 may be performed by a snapshot component 825 as described with reference to FIG. 8.

At 1210, the method may include generating, using metadata associated with the first snapshot of the first state, a first hash value. The operations of 1210 may be performed in accordance with examples as disclosed herein. In some examples, aspects of the operations of 1210 may be performed by a hash component 830 as described with reference to FIG. 8.

At 1215, the method may include storing the first hash value to a blockchain. The operations of 1215 may be performed in accordance with examples as disclosed herein. In some examples, aspects of the operations of 1215 may be performed by a blockchain interface 835 as described with reference to FIG. 8.

At 1220, the method may include storing, to the blockchain, a key associated with the first snapshot, where the key is stored to the blockchain in association with the first hash value. The operations of 1220 may be performed in accordance with examples as disclosed herein. In some examples, aspects of the operations of 1220 may be performed by a blockchain interface 835 as described with reference to FIG. 8.

At 1225, the method may include receiving an instruction to recover the first state of the data object using the first snapshot. The operations of 1225 may be performed in accordance with examples as disclosed herein. In some examples, aspects of the operations of 1225 may be performed by a recovery component 840 as described with reference to FIG. 8.

At 1230, the method may include retrieving the first hash value from the blockchain based on the instruction to recover the first state of the data object using the first snapshot. The operations of 1230 may be performed in accordance with examples as disclosed herein. In some examples, aspects of the operations of 1230 may be performed by a hash value identification component 845 as described with reference to FIG. 8.

At 1235, the method may include retrieving, based on the instruction to recover the first state, the key from the blockchain. The operations of 1235 may be performed in accordance with examples as disclosed herein. In some examples, aspects of the operations of 1235 may be performed by a hash value identification component 845 as described with reference to FIG. 8.

At 1240, the method may include decrypting the first snapshot using the key retrieved from the blockchain. The operations of 1240 may be performed in accordance with examples as disclosed herein. In some examples, aspects of the operations of 1240 may be performed by a decryption component 865 as described with reference to FIG. 8.

At 1245, the method may include comparing the first hash value retrieved from the blockchain to a second hash value of the metadata associated with the first snapshot. The operations of 1245 may be performed in accordance with examples as disclosed herein. In some examples, aspects of the operations of 1245 may be performed by a hash comparison component 850 as described with reference to FIG. 8.

At 1250, the method may include determining, based on a result of the comparing, whether the first snapshot stored in the data management system is unmodified. The operations of 1250 may be performed in accordance with examples as disclosed herein. In some examples, aspects of the operations of 1250 may be performed by a snapshot verification component 855 as described with reference to FIG. 8.

A method for data management is described. The method may include generating a first snapshot of a first state of a data object managed by a data management system, generating, using metadata associated with the first snapshot of the first state, a first hash value, storing the first hash value to a blockchain, receiving an instruction to recover the first state of the data object using the first snapshot, retrieving the first hash value from the blockchain based on the instruction to recover the first state of the data object using the first snapshot, comparing the first hash value retrieved from the blockchain to a second hash value of the metadata associated with the first snapshot, and determining, based on a result of the comparing, whether the first snapshot stored in the data management system is unmodified.

An apparatus for data management is described. The apparatus may include a processor, memory coupled with the processor, and instructions stored in the memory. The instructions may be executable by the processor to cause the apparatus to generate a first snapshot of a first state of a data object managed by a data management system, generate, using metadata associated with the first snapshot of the first state, a first hash value, store the first hash value to a blockchain, receive an instruction to recover the first state of the data object using the first snapshot, retrieve the first hash value from the blockchain based on the instruction to recover the first state of the data object using the first snapshot, compare the first hash value retrieved from the blockchain to a second hash value of the metadata associated with the first snapshot, and determine, based on a result of the comparing, whether the first snapshot stored in the data management system is unmodified.

Another apparatus for data management is described. The apparatus may include means for generating a first snapshot of a first state of a data object managed by a data management system, means for generating, using metadata associated with the first snapshot of the first state, a first hash value, means for storing the first hash value to a blockchain, means for receiving an instruction to recover the first state of the data object using the first snapshot, means for retrieving the first hash value from the blockchain based on the instruction to recover the first state of the data object using the first snapshot, means for comparing the first hash value retrieved from the blockchain to a second hash value of the metadata associated with the first snapshot, and means for determining, based on a result of the comparing, whether the first snapshot stored in the data management system is unmodified.

A non-transitory computer-readable medium storing code for data management is described. The code may include instructions executable by a processor to generate a first snapshot of a first state of a data object managed by a data management system, generate, using metadata associated with the first snapshot of the first state, a first hash value, store the first hash value to a blockchain, receive an instruction to recover the first state of the data object using the first snapshot, retrieve the first hash value from the blockchain based on the instruction to recover the first state of the data object using the first snapshot, compare the first hash value retrieved from the blockchain to a second hash value of the metadata associated with the first snapshot, and determine, based on a result of the comparing, whether the first snapshot stored in the data management system is unmodified.

In some examples of the method, apparatuses, and non-transitory computer-readable medium described herein, generating the first snapshot includes may include operations, features, means, or instructions for generating the first snapshot of an immutable template file of the data object, where the first hash value may be generated using the immutable template file.

In some examples of the method, apparatuses, and non-transitory computer-readable medium described herein, the data object may be a virtual machine, a virtual disc, a hard disc drive, a server, a virtual desktop, or any combination thereof.

In some examples of the method, apparatuses, and non-transitory computer-readable medium described herein, the immutable template file includes network certificates, network configurations, server configurations, application configurations, operating system configurations, or any combination thereof.

Some examples of the method, apparatuses, and non-transitory computer-readable medium described herein may further include operations, features, means, or instructions for storing, to the blockchain, a key associated with the first snapshot, where the key may be stored to the blockchain in association with the first hash value, retrieving, based on the instruction to recover the first state, the key from the blockchain, and decrypting the first snapshot using the key retrieved from the blockchain.

In some examples of the method, apparatuses, and non-transitory computer-readable medium described herein, generating the first snapshot may include operations, features, means, or instructions for generating the first snapshot of the data object by a storage appliance of the data management system that manages the data object.

In some examples of the method, apparatuses, and non-transitory computer-readable medium described herein, generating the first hash value may include operations, features, means, or instructions for generating the first hash value using a row of a backup metadata table for the data object.

In some examples of the method, apparatuses, and non-transitory computer-readable medium described herein, the metadata associated with the first snapshot includes one or more unique identifiers for a set of multiple files of the data object.

In some examples of the method, apparatuses, and non-transitory computer-readable medium described herein, the metadata associated with the first snapshot does not include a full image captured by the first snapshot.

In some examples of the method, apparatuses, and non-transitory computer-readable medium described herein, the first hash value may be generated based exclusively on one or more inputs that exclude the full image captured by the first snapshot, the one or more inputs including the metadata associated with the first snapshot.

In some examples of the method, apparatuses, and non-transitory computer-readable medium described herein, the blockchain may be a private blockchain managed by the data management system.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data management, comprising:
generating a first snapshot of a first state of a data object managed by a data management system;
storing metadata associated with the first snapshot of the first state in a row of a backup metadata table for the data object;
generating, using the metadata stored in the row of the backup metadata table associated with the first snapshot of the first state, a first hash value;
storing the first hash value to a blockchain;
storing, in the row of the backup metadata table, information indicative of a location of the first hash value as stored to the blockchain;
receiving an instruction to recover the first state of the data object using the first snapshot;
retrieving, using the information indicative of the location, the first hash value from the blockchain based at least in part on the instruction to recover the first state of the data object using the first snapshot;
comparing the first hash value retrieved from the blockchain to a second hash value of the row of the backup metadata table associated with the first snapshot; and
determining, based at least in part on a result of the comparing, whether the first snapshot stored in the data management system is unmodified.

2. The method of claim 1, further comprising:
storing, to the blockchain, a key associated with the first snapshot, wherein the key is stored to the blockchain in association with the first hash value;
retrieving, based at least in part on the instruction to recover the first state, the key from the blockchain; and
decrypting the first snapshot using the key retrieved from the blockchain.

3. The method of claim 1, wherein generating the first snapshot comprises:
generating the first snapshot of the data object by a storage appliance of the data management system that manages the data object.

4. The method of claim 1, wherein the metadata stored in the row of the backup metadata table comprises one or more identifiers associated with the data object, a customer number associated with the data object, a user number associated with the data object, a username associated with the data object, an additional hash value associated with the data object, a timestamp associated with the data object, a time stamp associated with generation of the first hash value, a time stamp associated with generation of the additional hash value, or any combination thereof.

5. The method of claim 1, wherein the metadata associated with the first snapshot comprises one or more unique identifiers for a plurality of files of the data object.

6. The method of claim 1, wherein the first hash value is generated based exclusively on one or more inputs that exclude an image captured by the first snapshot, the one or more inputs comprising the metadata associated with the first snapshot.

7. The method of claim 1, wherein the blockchain is a private blockchain managed by the data management system.

8. The method of claim 1, wherein:
the first snapshot is of an immutable template file of the data object; and
the first hash value is generated based at least in part on the immutable template file.

9. The method of claim 8, wherein the data object is a virtual machine, a virtual disc, a hard disc drive, a server, a virtual desktop, or any combination thereof.

10. The method of claim 8, wherein the immutable template file comprises network certificates, network configurations, server configurations, application configurations, operating system configurations, or any combination thereof.

11. An apparatus for data management, comprising:
a processor;
memory coupled with the processor; and
instructions stored in the memory and executable by the processor to cause the apparatus to:
generate a first snapshot of a first state of a data object managed by a data management system;
store metadata associated with the first snapshot of the first state in a row of a backup metadata table for the data object;
generate, using the metadata stored in the row of the backup metadata table associated with the first snapshot of the first state, a first hash value;
store the first hash value to a blockchain;
store, in the row of the backup metadata table, information indicative of a location of the first hash value as stored to the blockchain;
receive an instruction to recover the first state of the data object using the first snapshot;
retrieve, using the information indicative of the location, the first hash value from the blockchain based at least in part on the instruction to recover the first state of the data object using the first snapshot;
compare the first hash value retrieved from the blockchain to a second hash value of the row of the backup metadata table associated with the first snapshot; and
determine, based at least in part on a result of the comparing, whether the first snapshot stored in the data management system is unmodified.

12. The apparatus of claim 11, wherein the instructions are further executable by the processor to cause the apparatus to:
store, to the blockchain, a key associated with the first snapshot, wherein the key is stored to the blockchain in association with the first hash value;
retrieve, based at least in part on the instruction to recover the first state, the key from the blockchain; and
decrypt the first snapshot using the key retrieved from the blockchain.

13. The apparatus of claim 11, wherein, to generate the first snapshot, the instructions are executable by the processor to cause the apparatus to:
generate the first snapshot of the data object by a storage appliance of the data management system that manages the data object.

14. The apparatus of claim 11, wherein the metadata stored in the row of the backup metadata table comprises one or more identifiers associated with the data object, a customer number associated with the data object, a user number associated with the data object, a username associated with the data object, an additional hash value associated with the data object, a timestamp associated with the data object, a time stamp associated with generation of the first hash value, a time stamp associated with generation of the additional hash value, or any combination thereof.

15. The apparatus of claim 11, wherein the metadata associated with the first snapshot comprises one or more unique identifiers for a plurality of files of the data object.

16. The apparatus of claim 11, wherein the first hash value is generated based exclusively on one or more inputs that exclude an image captured by the first snapshot, the one or more inputs comprising the metadata associated with the first snapshot.

17. The apparatus of claim 11, wherein:
the first snapshot is of an immutable template file of the data object; and
the first hash value is generated based at least in part on the immutable template file.

18. The apparatus of claim 17, wherein the data object is a virtual machine, a virtual disc, a hard disc drive, a server, a virtual desktop, or any combination thereof.

19. The apparatus of claim 17, wherein the immutable template file comprises network certificates, network configurations, server configurations, application configurations, operating system configurations, or any combination thereof.

20. A non-transitory computer-readable medium storing code for data management, the code comprising instructions executable by a processor to:

generate a first snapshot of a first state of a data object managed by a data management system;
store metadata associated with the first snapshot of the first state in a row of a backup metadata table for the data object;
generate, using the metadata stored in the row of the backup metadata table associated with the first snapshot of the first state, a first hash value;
store the first hash value to a blockchain;
store, in the row of the backup metadata table, information indicative of a location of the first hash value as stored to the blockchain;
receive an instruction to recover the first state of the data object using the first snapshot;
retrieve, using the information indicative of the location, the first hash value from the blockchain based at least in part on the instruction to recover the first state of the data object using the first snapshot;
compare the first hash value retrieved from the blockchain to a second hash value of the row of the backup metadata table associated with the first snapshot; and
determine, based at least in part on a result of the comparing, whether the first snapshot stored in the data management system is unmodified.

* * * * *